(12) United States Patent
James

(10) Patent No.: US 7,856,658 B2
(45) Date of Patent: *Dec. 21, 2010

(54) METHOD AND SYSTEM FOR INCORPORATING TRUSTED METADATA IN A COMPUTING ENVIRONMENT

(75) Inventor: Stanley James, Red Feather Lakes, CO (US)

(73) Assignee: Lijit Networks, Inc., Louisville, CO (US)

( * ) Notice: Subject to any disclaimer, the term of this patent is extended or adjusted under 35 U.S.C. 154(b) by 604 days.

This patent is subject to a terminal disclaimer.

(21) Appl. No.: 11/471,200

(22) Filed: Jun. 20, 2006

(65) Prior Publication Data
US 2007/0174249 A1    Jul. 26, 2007

Related U.S. Application Data

(60) Provisional application No. 60/691,838, filed on Jun. 20, 2005.

(51) Int. Cl.
| | |
|---|---|
| G06F 17/30 | (2006.01) |
| G06F 7/04 | (2006.01) |
| H04L 29/06 | (2006.01) |
| H04L 9/32 | (2006.01) |
| G06F 21/00 | (2006.01) |
| G06F 15/16 | (2006.01) |
| G06F 17/00 | (2006.01) |

(52) U.S. Cl. .............................. 726/6; 726/26; 713/151; 713/155; 713/165; 713/168; 713/182; 709/229; 707/602; 707/603; 707/607; 707/608; 707/609; 707/687

(58) Field of Classification Search .................... 726/6, 726/26; 713/151, 155, 165, 168, 182; 707/3, 707/9, 10; 709/229
See application file for complete search history.

(56) References Cited

U.S. PATENT DOCUMENTS 5,958,051 A  *  9/1999  Renaud et al. ................. 726/22

(Continued)

FOREIGN PATENT DOCUMENTS

WO    PCT/US07/71661    7/2007

OTHER PUBLICATIONS

Friendster Home Page; weblink http://www.friendster.com; May 31, 2007; 2 pages.

(Continued)

*Primary Examiner*—Aravind K Moorthy
(74) *Attorney, Agent, or Firm*—Cooley LLP

(57) ABSTRACT

A method and system for incorporating trusted metadata in a computing environment is described. One illustrative embodiment is a system comprising at least one functional module configured to query a personalized database of trusted metadata including at least one report from an informer network that includes the computer user and at least one informer, each informer in the informer network being trusted by the computer user either directly or indirectly, each indirectly trusted informer being trusted directly by at least one other informer in the informer network, each of the at least one report including a subjective assertion regarding the quality of an item or an expression of a degree of trust in an informer; and at least one functional module configured to perform a task in the computing environment based at least in part on results of a query of the personalized database of trusted metadata.

23 Claims, 15 Drawing Sheets

U.S. PATENT DOCUMENTS

| | | | |
|---|---|---|---|
| 6,567,980 | B1 | 5/2003 | Jain |
| 7,069,308 | B2 | 6/2006 | Abrams |
| 7,117,254 | B2 | 10/2006 | Lunt |
| 7,155,738 | B2 | 12/2006 | Zhu |
| 7,188,153 | B2 | 3/2007 | Lunt |
| 7,225,407 | B2 | 5/2007 | Sommerer |
| 7,249,380 | B2 | 7/2007 | Yang |
| 7,330,536 | B2 | 2/2008 | Claudatos |
| 7,330,863 | B2 | 2/2008 | Carro |
| 7,437,568 | B2 * | 10/2008 | Das-Purkayastha et al. .. 713/187 |
| 7,606,096 | B2 | 10/2009 | Hamada |
| 7,607,096 | B2 | 10/2009 | Oreizy |
| 7,630,986 | B1 * | 12/2009 | Herz et al. ............ 707/10 |
| 2003/0126136 | A1 * | 7/2003 | Omoigui ............ 707/10 |
| 2003/0220802 | A1 * | 11/2003 | Cossey et al. ............ 705/1 |
| 2004/0153514 | A1 * | 8/2004 | Crane ............ 709/206 |
| 2004/0255122 | A1 * | 12/2004 | Ingerman et al. ............ 713/176 |
| 2005/0039191 | A1 * | 2/2005 | Hewson et al. ............ 719/317 |
| 2005/0181762 | A1 * | 8/2005 | Kauppila ............ 455/410 |
| 2005/0210285 | A1 | 9/2005 | Williams |
| 2005/0232423 | A1 * | 10/2005 | Horvitz et al. ............ 380/255 |
| 2005/0256866 | A1 | 11/2005 | Lu |
| 2006/0059183 | A1 * | 3/2006 | Pearson et al. ............ 707/101 |
| 2006/0259767 | A1 * | 11/2006 | Mansz et al. ............ 713/168 |
| 2007/0118639 | A1 * | 5/2007 | Bellifemine et al. ........ 709/224 |

OTHER PUBLICATIONS

Friendster definition from *Wikipedia*, weblink http://en.wikipedia.org/wiki/Friendster; May 31, 2007; 3 pages.

Shiraishi, Nobuhisa; *The RDF Trust Model using RDF Bookmark and Its Application*; Paper and Slideshow from NEC weblink http://web.sfc.keio.ac.jp/~kaz/www2004/slides/ns/slide1-0.html; Jun. 19, 2007; 27 pages.

* cited by examiner

US 7,856,658 B2

METHOD AND SYSTEM FOR INCORPORATING TRUSTED METADATA IN A COMPUTING ENVIRONMENT

PRIORITY

The present application claims priority from U.S. Provisional Application No. 60/691,838, filed Jun. 20, 2005, entitled "Method for Calculating Trust Values in a Network," which is incorporated herein by reference in its entirety.

RELATED APPLICATIONS

This application is related to U.S. application Ser. No. 11/471,199, entitled "Method and System for Constructing and Using a Personalized Database of Trusted Metadata," filed herewith.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to methods and systems for generating and applying metadata. In particular, but not by way of limitation, the present invention relates to techniques for incorporating trusted metadata in a computing environment associated with a computer user.

BACKGROUND OF THE INVENTION

Many things found on the Internet are of low quality, false, or dangerous. Web surfers are often asked to make decisions of trust with little or no background information. To address this problem, a wide variety of Internet entities provide reputation ratings for sellers of products or services, reviews of products or other items, or both. Broadly speaking, such data about other data may be termed "metadata." For example, AMAZON.COM provides reviews of products written by other customers and reputation ratings for sellers who partner with AMAZON.COM. The AMAZON.COM product review system also allows customers to indicate whether a given review was helpful or not.

Though useful, conventional metadata systems are only as trustworthy as the people submitting the opinions. Unfortunately, those individuals are generally complete strangers to the computer user. Even if the user knows where on the Internet to find information from a trusted source on a particular topic, that information is not automatically presented to the user in the relevant context.

Conventional metadata systems fail to take into account that people generally make decisions based on the advice of a relatively small number of known, trusted friends or experts, nor do they automatically present such information to the user when a relevant context arises. It is thus apparent that there is a need in the art for an improved method and system for incorporating trusted metadata in a computing environment associated with a computer user.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for incorporating trusted metadata in a computing environment associated with a computer user. One illustrative embodiment is a method for providing trustworthy information about an item, comprising querying a personalized database of trusted metadata concerning the item, the personalized database of trusted metadata including at least one report, the at least one report emanating from metadata received from an informer network, the informer network including a computer user and at least one informer, each informer in the informer network being trusted by the computer user either directly or indirectly, each indirectly trusted informer being trusted directly by at least one other informer in the informer network, each of the at least one report including a subjective assertion regarding the quality of an item or an expression of a degree of trust in an informer; and indicating to the computer user the item's subjective quality based on at least one report about the item in the personalized database of trusted metadata.

Another illustrative embodiment is a method for processing an item by computer, comprising querying a personalized database of trusted metadata concerning the item, the personalized database of trusted metadata including at least one report, the at least one report emanating from metadata received from an informer network, the informer network including a computer user and at least one informer, each informer in the informer network being trusted by the computer user either directly or indirectly, each indirectly trusted informer being trusted directly by at least one other informer in the informer network, each of the at least one report including a subjective assertion regarding the quality of an item or an expression of a degree of trust in an informer; determining the item's subjective quality based on at least one report about the item in the personalized database of trusted metadata; and processing the item in accordance with its subjective quality.

Another illustrative embodiment is a system for incorporating trusted metadata in a computing environment associated with a computer user, comprising at least one functional module configured to query a personalized database of trusted metadata, the personalized database of trusted metadata including at least one report, the at least one report emanating from metadata received from an informer network, the informer network including the computer user and at least one informer, each informer in the informer network being trusted by the computer user either directly or indirectly, each indirectly trusted informer being trusted directly by at least one other informer in the informer network, each of the at least one report including one of a subjective assertion regarding the quality of an item and an expression of a degree of trust in an informer; and at least one functional module configured to perform a task in the computing environment based at least in part on results of a query of the personalized database of trusted metadata. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
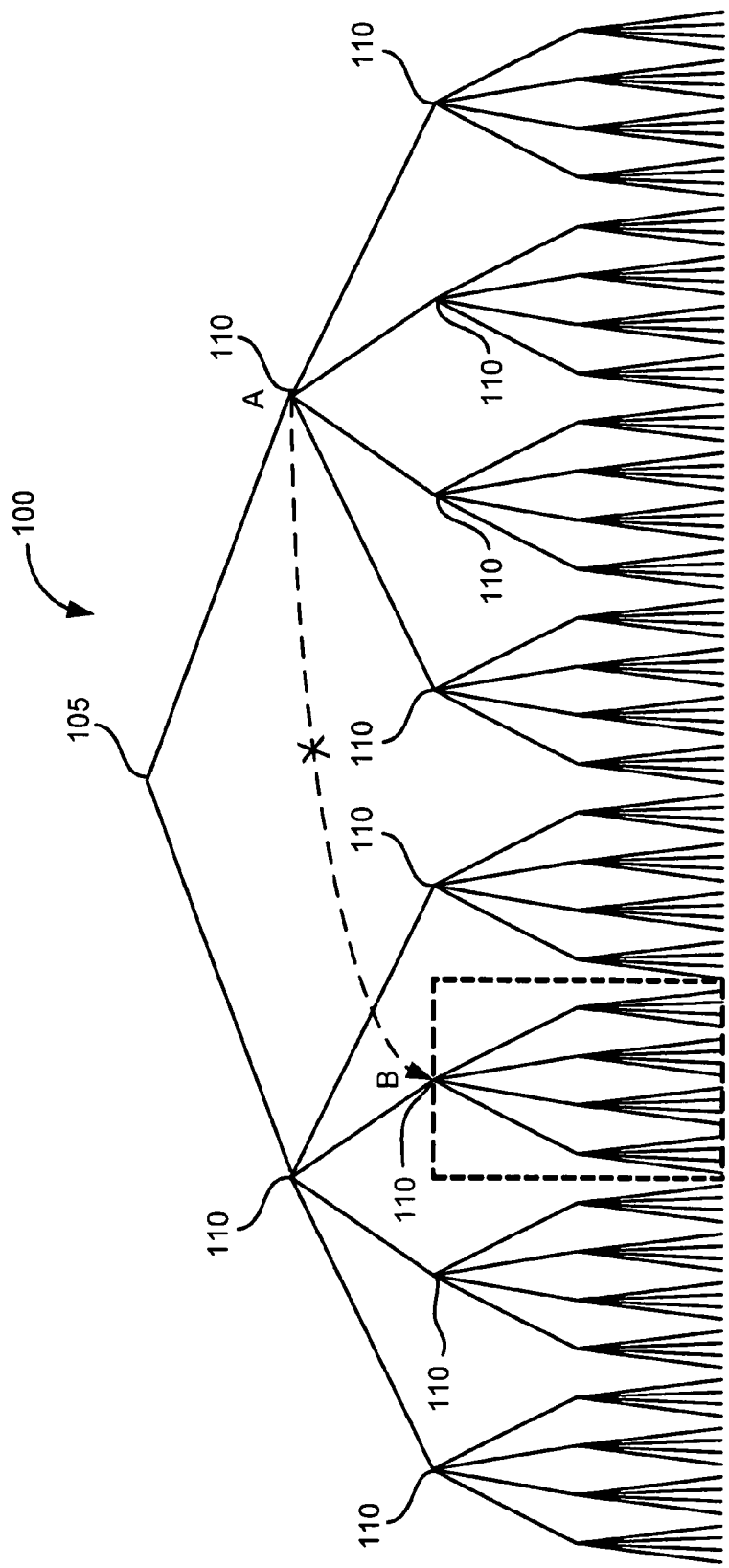
FIG. 1 is a diagram of an informer network in accordance with an illustrative embodiment of the invention.

People make decisions based primarily on a few people, organizations, or information sources that they trust. Most people have a set of experts whom they consult in designated areas. For example, one might have a neighbor who is an expert on car repair, a friend's cousin who is a law expert, and a trusted Web site for ratings of stereo equipment. In an illustrative embodiment, the invention provides a method and system for intelligently collecting and sorting metadata from these experts into a database and using the database to improve many aspects of using a computer network. In short, the invention can help computer users find the good stuff and avoid the bad.

Several illustrative embodiments of the invention are briefly summarized below.

(1) In one illustrative embodiment, a personalized database of trusted metadata ("database") is constructed and maintained for each user. For example, the metadata may concern the trustworthiness, subjective quality, and categorization of resources. This database is in turn used by other applications.

(2) In another illustrative embodiment, search results are improved by including information from trusted informers in determining the quality and relevance of search results, and by providing additional data that can be searched.

(3) In another illustrative embodiment, users are provided with trusted reports about resources encountered on a computer network. In this embodiment, the trusted reports especially concern the quality of those resources. Examples of such resources include, without limitation, Web sites, links on Web pages, downloaded files, files in a user's local file system, and processes running on a user's computer.

(4) In another illustrative embodiment, users, when requested, are presented with selections of high-quality resources as identified by the database.

(5) In another illustrative embodiment, the authenticity of files is validated using "fingerprint" metadata generated by cryptographic hash functions as targets of reports within the database.

(6) In another illustrative embodiment, processes on a computer are identified, and their execution is restricted based on trusted metadata.

(7) In another illustrative embodiment, access to data is restricted using a challenge-response protocol based on trusted metadata.

(8) In yet another embodiment, electronic message exchange is limited to trusted parties based on trusted metadata.

After a brief background discussion of metadata, this Detailed Description describes illustrative methods for determining trust values. The remainder of the document describes illustrative implementations and applications in greater detail. In the drawings that follow, like or similar elements are designated with identical reference numerals throughout the several views.

Metadata

Metadata is data that is about other data. For example, if a computer document contains an assertion that another document found at the Internet address "http://www.w3.org/test/page" was created by "John Doe," this would be an example of metadata. The "target" of the metadata is "http://www.w3.org/test/page," and the "content" of the metadata is "was created by John Doe."

There are many ways that metadata assertions can be encoded in a file. A popular method for encoding such data is Resource Description Framework (RDF). The above example assertion could be encoded in RDF as follows:

<Description about="http://www.w3.org/test/page" Author="John Doe"/>

Another method is with so-called "microformats" embedded in other types of documents. For example, the "Vote Links" format (http://microformats.org/wiki/votelinks) is designed to add voting information to normal HTML links. For example, if the author of a page somehow disagrees with the page found at http://example.com/bad, this could be encoded as follows:

<a rev="vote-against" href="http://example.com/bad" title="Bad Page">Example Bad Page</a>.

In one illustrative embodiment, the top-level standard used is RDF Site Summary (RSS), which is in turn based on RDF, which is in turn based on Extensible Markup Language (XML). Within these standards, metadata targets can be identified by a Universal Resource Identifier (URI). A common example of a URI is a Uniform Resource Locator (URL), commonly used to identify Web pages. For example, "http://www.w3.org" is the address of the World Wide Web Consortium. URIs are most often used to identify files on the Internet, but can also refer to organizations, people, and other "real-world" entities.

There are many potential sources of metadata. Files containing properly-formatted metadata may be authored by individuals, organizations, sub-groups within an organization, or automatically generated from other sources. For brevity, all of these sources of metadata will be referred to herein as "informers." Unless explicitly mentioned, no distinction is made herein between an informer and the metadata-containing file which is authored by that informer. That is, "Informer X trusts informer Y" means that informer X has included metadata in his or her file making such an assertion of trust. In some embodiments, an informer has complete control over his or her file. A collection of metadata referring to a particular target contained in one informer's file is herein termed a "report."

A report may also include a "scope," which widens the target and determines a range of objects to which the report applies. For example, an informer may report that any file found on the server at "http://www.cnn.com" should have the tag "news" and a rating of "high quality." In one embodiment, scope is expressed by replacing the portion of the address to be generalized with an asterisk (e.g., http://www.cnn.com/headlines/*). In another embodiment, scope may be inferred from the address itself using common conventions. For example, a report about "http://cnn.com/" could be inferred to be generalized to all pages from the server with the address of "cnn.com".

In an illustrative embodiment of the invention, the chosen standard for reports is capable of expressing assertions of trust, distrust, high-quality, and low-quality. These assertions may be either discrete (e.g., on/off) or expressed in numeric degrees (e.g., 0-100).

Reports may also assign a number of tags to the target (described in more detail below) or contain descriptive text about the target. In some embodiments, trust is not required to be mutual. In those embodiments, it is possible for informer X to trust informer Y while at the same time informer Y does not trust informer X.

Two example reports are shown below as they might be encoded according to the RSS/RDF/XML standard:

```
<item rdf:about="http://www.cnn.com/">
    <title>CNN News</title>
    <link>http://www.cnn.com/</link>
    <description>CNN (Cable News Network) provides news from
    around the
world.</description>
    <dc:creator>Stan</dc:creator>
    <dc:date>2005-04-02T18:18:52Z</dc:date>
    <of:quality>50</of:quality>
    <of:scope>*cnn.com*</of:scope>
    <dc:subject>news tv cable</dc:subject>
</item>
<item rdf:about="http://getoutfoxed.com/users/mike">
    <title>Mike Berger</title>
    <link>http://getoutfoxed.com/users/mike</link>
    <description>CogSci Student</description>
    <dc:creator>Stan</dc:creator>
```

-continued

```
    <dc:date>2005-05-02T16:15:20Z</dc:date>
    <of:quality>50</of:quality>
    <dc:subject>_RSS logic</dc:subject>
</item>
```

The target of each report above is specified by the "rdf:about" attribute of the "item" tag. The "quality" of the target is indicated by the "of:quality" tag. The scope of the target is indicated by the "of:scope" tag. The "tags" of the target are contained, separated by spaces, in the "dc:subject" tag. (Unfortunately, "tag" has come to have two meanings within Internet applications. The first sense is that of an identifier in an XML-style file, typically enclosed in angle brackets. For example, the <a> tag from HTML. The second sense, which is the primary sense used herein, is that of a keyword associated with some data. Use of these tags for organizing bookmarks was popularized by the Web site del.icio.us.)

The second report above is about an informer. The fact that the target is an informer is encoded by the presence of the "_RSS" tag in "dc:subject". (This may be interpreted to read "the file found at the target address is formatted in RSS.") Note that in this embodiment, trust and quality are not entirely separate notions. "Trust" is the combination of "high quality" and "informer." Thus, the second example report can be seen to be an expression of trust in the target (the informer), and the degree of trust is 50. In one embodiment, the absence of an explicit quality rating (e.g. "of:quality") could be understood to imply a standard high-quality rating of user-determined numeric value.

Assigning Trust Values

In an illustrative embodiment, a "trust value" is a numeric representation of the trust a user places in a report or informer. This concept is inspired by and in a limited sense attempts to model the colloquial social concept of "trust." For example, the phrase "most trusted informer" or "most trusted report" refers, in this embodiment, to the informer or report with the highest numerical trust value.

For informers, the trust value can be thought of as the confidence that the user and the informer share the same opinions. Therefore, a value close to zero does not mean that user and informer have opposing opinions, but rather that the correlation between their opinions is uncertain.

The calculation of trust values can be realized in various ways mathematically. For example, one illustrative embodiment of the invention expresses both trust and distrust in a single value that can range between −100 and 100. This value represents the confidence that the values of the target entity are in line (positive) or not in line (negative) with those of the author of the metadata. (Colloquial trust has many dimensions, but, in this illustrative embodiment, the most important are estimated congruency of values and confidence in that congruency.) A trust value of zero indicates no confidence in either direction, i.e. the similarity is unknown. A trust value of 100 indicates total agreement in every possible situation.

In this illustrative embodiment, the user creates or selects an informer file that is used as the "seed" from which the trust values can be computed. Typically, this file is the informer file of the user. However, it is not required that it be available to any other users in the computer network. For the database to grow beyond the contents of this seed file, the file must, in this embodiment, contain a report on at least one other informer that indicates a degree of trust in the other informer.

The network of informers trusted by a user can be thought of as an exclusive club, with the user as the club's founding member. Informers can become members of the club only if a current member is willing to sponsor them. Thus, there exists a "chain of sponsorship" from any member back to the founding member. Members with shorter chains have more influence within the club. If more than one member is willing to sponsor an informer, the informer can maximize his influence by accepting the sponsorship of the member with the shortest chain.

But in this illustrative embodiment, there is one catch: Even if an existing member is willing to sponsor a potential new member, the potential new member can be barred from joining if there is another member closer to the user who has written a complaint about that potential member. This is his right as the more influential member.

In this illustrative embodiment, members may add sponsorships, revoke sponsorships, or write complaints at any time. Members who have lost their sponsor can keep their membership only if there is another member who is willing to sponsor them and the new sponsor is more influential than any members who have written complaints.

Referring now to FIG. 1, it is a diagram of an informer network in accordance with an illustrative embodiment of the invention. FIG. 1 shows an idealized informer network 100 with the user 105 at the top and each informer 110 introducing four unique new informers into the informer network 100. Only links that bring new informers into the network are shown in FIG. 1. As indicated by the dotted arc, the informer 110 labeled "A" that is one hop away from user 105 has entered a new report asserting distrust of the informer 110 labeled "B" that is two hops away. This action removes informer B from the user's network, and any other informers 110 which were only trusted via informer B (i.e., informers within the dotted box in FIG. 1). All metadata reports from these removed informers 110 are also removed from the database.

The net effect is that every informer in a user's informer network 100 has "authority" over any informer or report further from the user. In the simplest case, distance is synonymous with the number of hops from user 105. Some variations are discussed below. In this way, network maintenance is delegated to others, and many users can benefit from the action of one.

Table 1 shows a small informer network 100 containing seven informer files. Each informer file is preceded by the name of the associated informer in bold type. Each row within a given informer file represents one report.

TABLE 1

| Target | Rating |
|---|---|
| http://orange.com/bob | |
| http://yellow.com/mary | Trusted |
| http://green.com/ann | Trusted |
| http://sofa.com | Good |
| http://yellow.com/mary | |
| http://green.com/leo | Trusted |
| http://green.com/ann | Trusted |
| http://corp.com/ | Good |
| http://green.com/leo | |
| http://red.com/basty | Trusted |
| http://auto.com | Good |
| http://corp.com/ | Bad |

TABLE 1-continued

| Target | Rating |
|---|---|
| http://red.com/basty | |
| http://yellow.com/mary | Trusted |
| http://chair.com | Good |
| http://orange.com/bob | Trusted |
| http://orange.com/suzanne | Trusted |
| http://green.com/ann | |
| http://red.com/basty | Distrusted |
| http://green.com/sue | Trusted |
| http://corp.com/ | Good |
| http://green.com/sue | |
| http://sofa.com | Bad |
| http://red.com/basty | Trusted |
| http://orange.com/suzanne | |
| http://red.com/basty | Trusted |

FIGS. 2A-2D are diagrams showing how trust values are assigned to informers 110 in an informer network 100 in accordance with an illustrative embodiment of the invention. In this illustrative embodiment, a series of steps is performed to determine the trust levels that our sample user Bob would ascribe to other informers 110 in the informer network 100. Only user 105 (Bob), informers 110, and trust relations between informers 110 are shown in FIGS. 2A-2D. Reports about other resources are not shown. (For brevity, only informers' simple names are used rather than the full URI as in Table 1.)

Figure 2A:
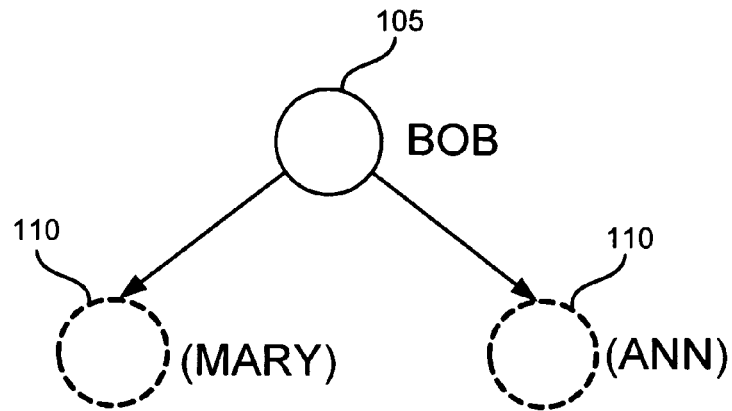
FIGS. 2A-2D are diagrams showing how trust values are assigned to informers in an informer network in accordance with an illustrative embodiment of the invention.

Refer to FIG. 2A. In the first step, reports from Bob's own metadata file are immediately added to the database. Leo and Ann are rated as trusted informers 110 by Bob, so their files are entered into a queue of files to be loaded. In FIGS. 2A-2D, those informers 110 whose reports have not yet been added to the database are enclosed in parentheses.

Figure 2B:
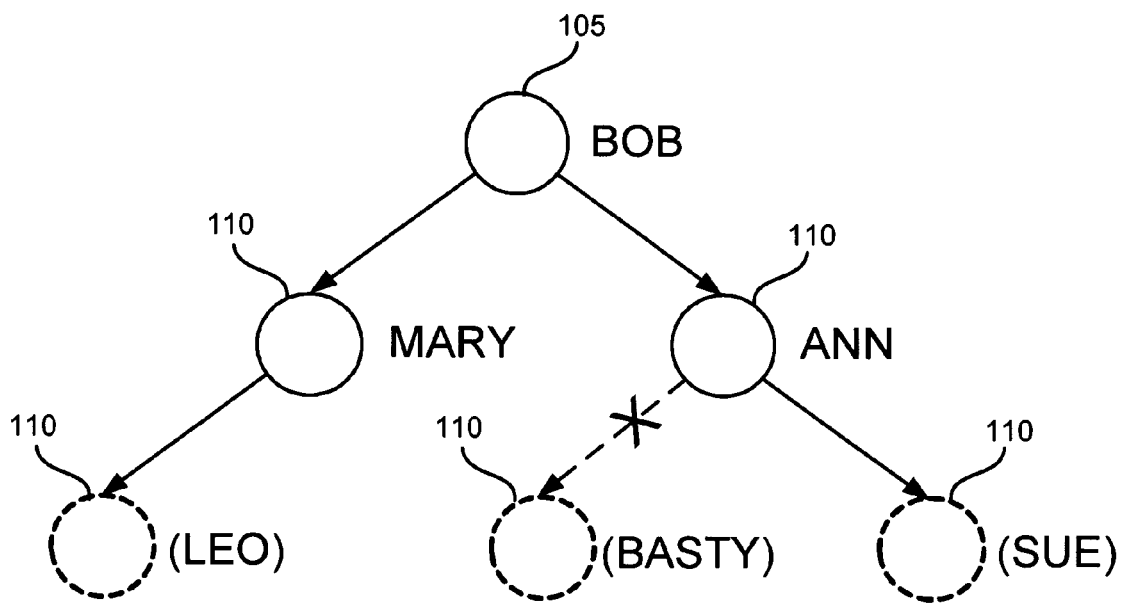

Referring to FIG. 2B, Mary's and Ann's files are loaded, and their reports are added to the database. Leo and Sue are rated as trustworthy informers (by Mary and Ann, respectively) and are added to the queue, but Basty is rated as "Distrusted" (by Ann) and is, therefore, ignored. Ann's distrust of Basty is represented in FIG. 2B by a dotted line with an "X".

Figure 2C:
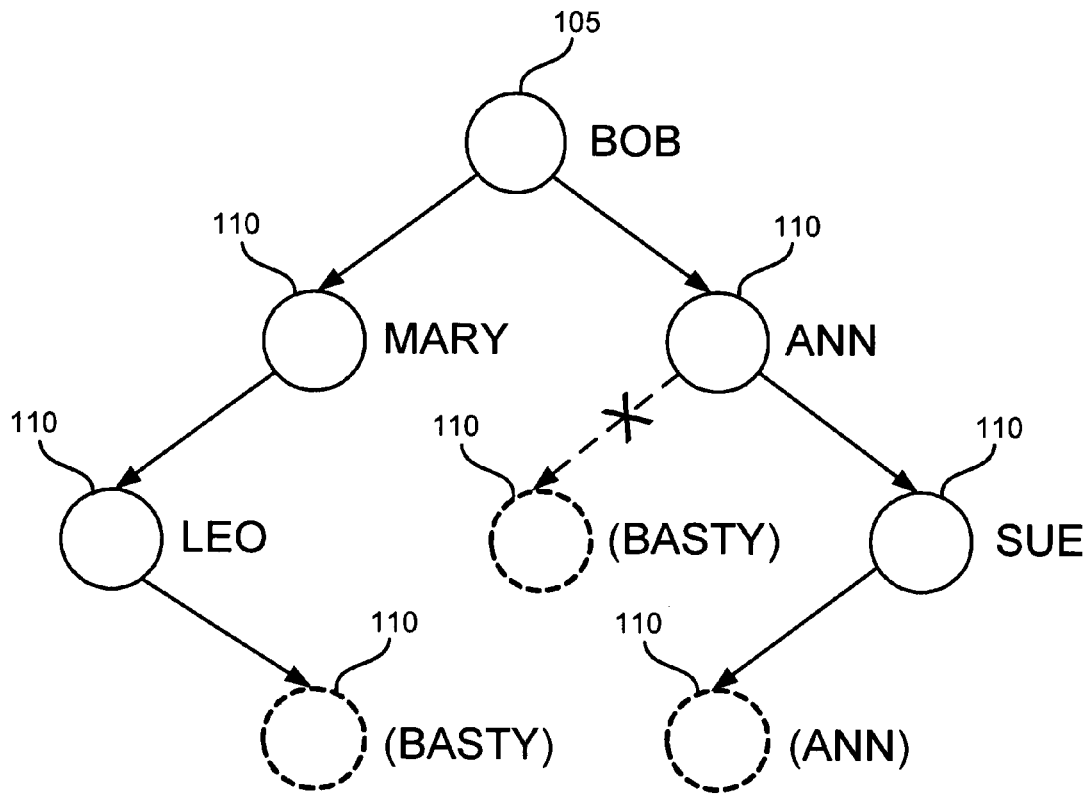

Referring to FIG. 2C, Leo's file is loaded, which reveals that he trusts Basty. However, because Basty is already rated as distrusted by Ann, he is not added to the queue. This can be put in another way: There are now two informers 110 saying something about Basty. Which opinion is ultimately acted upon depends on which informer 110 is more trusted. Ann is one hop away, and Leo is two hops away. Therefore, Ann is trusted more than Leo, and her advice not to import any reports from Basty is followed. (Note that this also means that Suzanne will not be included in the network at all since she is trusted only by Basty.) Also in the step shown in FIG. 2C, it is discovered that Sue trusts Ann. However, Ann is not added to the queue because Ann is already in the tree (i.e., a trust level for Ann has already been determined). As with Basty, there are two informers saying something about Ann. But Bob is zero hops from himself, so his opinion is trusted more than anyone else's.

Figure 2D:
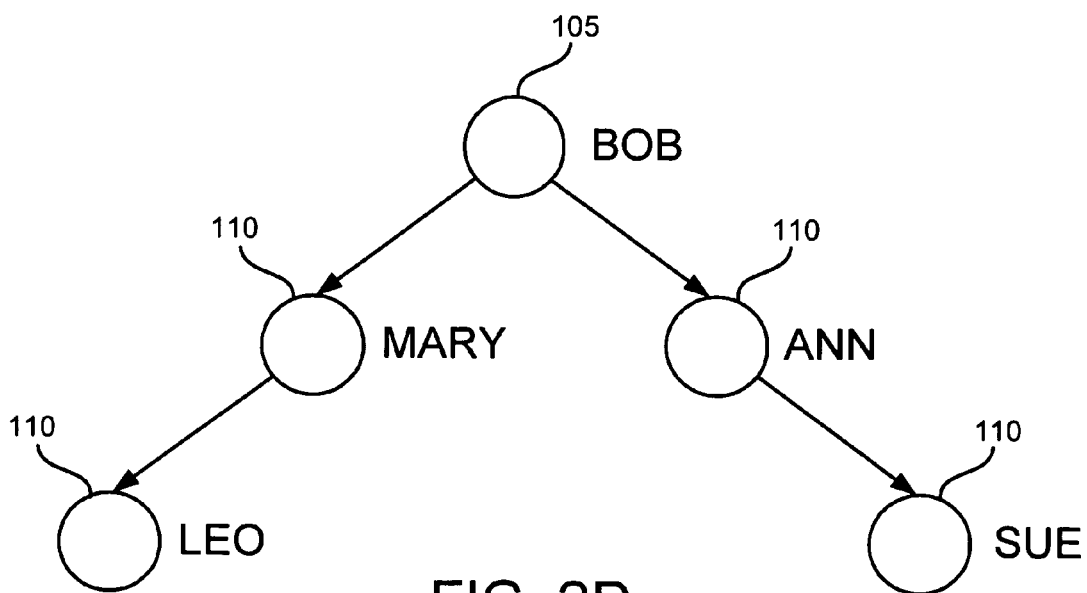

FIG. 2D shows the final "tree of trust" for Bob in the above example.

In the simple case discussed above, the numerical trust value of an informer 110 (or a report) can be expressed as the inverse of the minimum number of "hops" required to reach the informer 110 (or the informer 110 making the report) starting from the user's informer file. For example, if the user 105 trusts informer X who in turn expresses trust in informer Y, then informer Y and the reports in Y's informer file would be two hops away from the user. To prevent values of infinity for cases in which the number of hops is zero (i.e., in cases where the user has made the report), one may be added to the number of hops before taking the inverse. For the above example, the total trust value would be 1/(1+(2 hops from user to Y))=⅓. More generally, the trust placed in target t relative to a source informer s is shown in the following equation:

$$\text{trust}(s, t) = \frac{1}{1 + (\text{hops from } s \text{ to } t)}.$$

In the previous example, trust and distrust were discrete, and the trust value of each informer was directly related to the number of hops to the user. However, more fine-grained values of trust are possible and, in some embodiments, preferable. In the following illustrative embodiment, trust is defined as having values in the range [0,1], where 1 indicates complete trust and 0 indicates distrust. Trust values may also be undefined in cases where a numerical value cannot be determined. Trust values whose range includes negative numbers can be mapped to this approach if the negative values are mapped to zero. Which approach is preferable depends on the particular embodiment.

Figure 3:
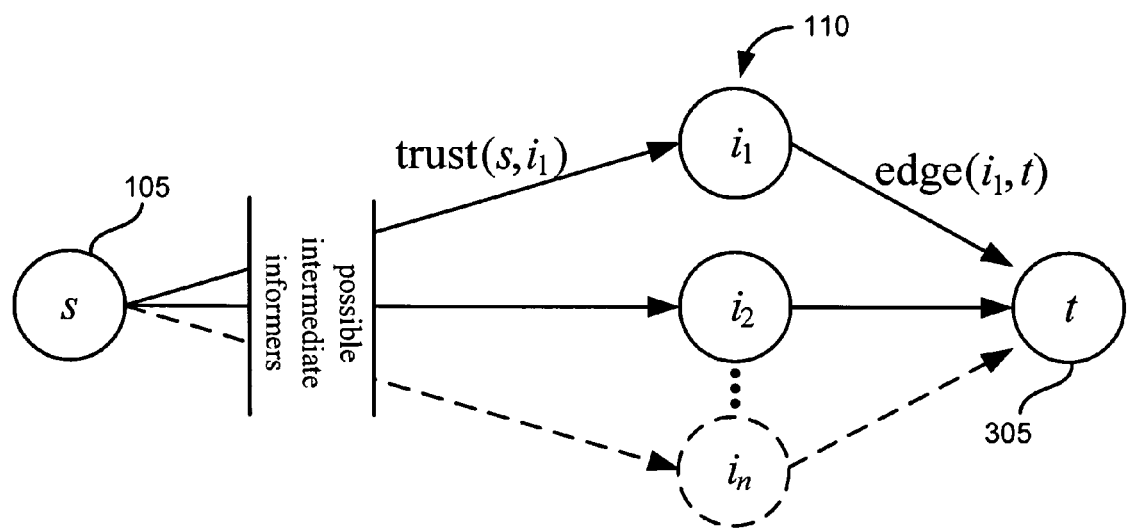
FIG. 3 is a diagram of non-discrete trust value calculation in accordance with an illustrative embodiment of the invention.

Referring to FIG. 3, it is a diagram of non-discrete trust value calculation in accordance with an illustrative embodiment of the invention. In this embodiment, non-discrete trust values are computed for informers 110. Trust is defined between two informers 110, the source s and the target t. Typically, s will be the user 105 of the system. To calculate how much s trusts t, all informers 110 that have an "edge" to t (i.e., all informers with a report about t) are considered. In FIG. 3, these are labeled as $i_1$ to $i_n$. (Note that these informers 110 need not be directly trusted by s. In such cases there will be a chain of intermediate informers 110.) If there are no informers with an edge to t (i.e., n=0), the trust between s and t is undefined. If there is only one such informer (i.e., n=1), the trust of this informer is multiplied by how much this informer trusts the target. Those skilled in the art will recognize that this computation can be performed by recursively determining the trust value of this informer. In equation form, this can be expressed as $\text{trust}(s,t) = \text{trust}(s,i_1) \cdot \text{edge}(i_1,t)$.

If there is more than one such informer (i.e., n>1), the one with the highest trust value is chosen. That highest trust value is multiplied by how much this informer trusts the target, as shown in the following equation:

$$\text{trust}(s,t) = \forall i(\text{edge}(i,t)) : \max(\text{trust}(s,i)) \cdot \text{edge}(i_{max},t).$$

As in the single informer case, trust values can be determined by recursively determining each value of $\text{trust}(s,i_n)$ for all n informers. In the preceding equation, $i_{max}$ is the informer 110 that has the highest trust value, $\max(\text{trust}(s,i))$.

It is possible that one of the informers 110 with an edge to t might be s. To handle these cases, the trust between any informer 110 and itself is defined to be 1.0. This definition also serves as the base condition that ends the recursive computations of trust in the equations above. If all of the edges between informers are the same value (greater than 0 and less than 1), then this model reduces to the discrete hop-based case discussed above.

In an alternative embodiment, informers 110 other than the most trusted one are considered when the trust placed in the target is determined. One way to accomplish this is to average all the trust values of informers 110 with reports about the target, weighted by the trust placed in each. This can be expressed in equation form as follows:

$$\text{trust}(s, t) = \\ \forall i(\text{edge}(i, t)) : \frac{(\text{trust}(s, i_1) \cdot \text{trust}(i_1, t)) + \ldots + (\text{trust}(s, i_n) \cdot \text{trust}(i_n, t))}{\text{trust}(s, i_1) + \ldots + \text{trust}(s, i_n)}.$$

One disadvantage of this embodiment is that it makes the system vulnerable to a Goolgebomb-style attack: An attacker could create numerous dummy-informers, which could sway the trust ratings of other informers despite being very weakly trusted themselves. This may be mitigated by setting a hard limit on either the number of informers 110 which are included in the calculation (e.g. the top five) or a minimum required trust value.

Table 2 shows a small informer network 100 containing seven informer files. Each informer file is preceded by the name of the associated informer in bold type. Each row within a given informer file represents one report. In this example, numerical (non-discrete) trust values have been assigned to the informers 110 and resources.

TABLE 2

| Target | Rating | Degree |
|---|---|---|
| http://orange.com/bob | | |
| http://yellow.com/mary | Trusted | .6 |
| http://green.com/ann | Trusted | .4 |
| http://sofa.com | Good | .5 |
| http://yellow.com/mary | | |
| http://green.com/leo | Trusted | .8 |
| http://green.com/ann | Trusted | .7 |
| http://corp.com/ | Good | .5 |
| http://green.com/leo | | |
| http://red.com/basty | Trusted | .6 |
| http://auto.com | Good | .4 |
| http://corp.com/ | Bad | .4 |
| http://red.com/basty | | |
| http://yellow.com/mary | Trusted | .6 |
| http://chair.com | Good | .8 |
| http://orange.com/bob | Trusted | .5 |
| http://orange.com/suzanne | Trusted | .5 |
| http://green.com/ann | | |
| http://red.com/basty | Distrusted | 0 |
| http://green.com/sue | Trusted | .5 |
| http://corp.com/ | Good | .4 |
| http://green.com/sue | | |
| http://sofa.com | Bad | .5 |
| http://red.com/basty | Trusted | .6 |
| http://orange.com/suzanne | | |
| http://red.com/basty | Trusted | .6 |

Figure 4:
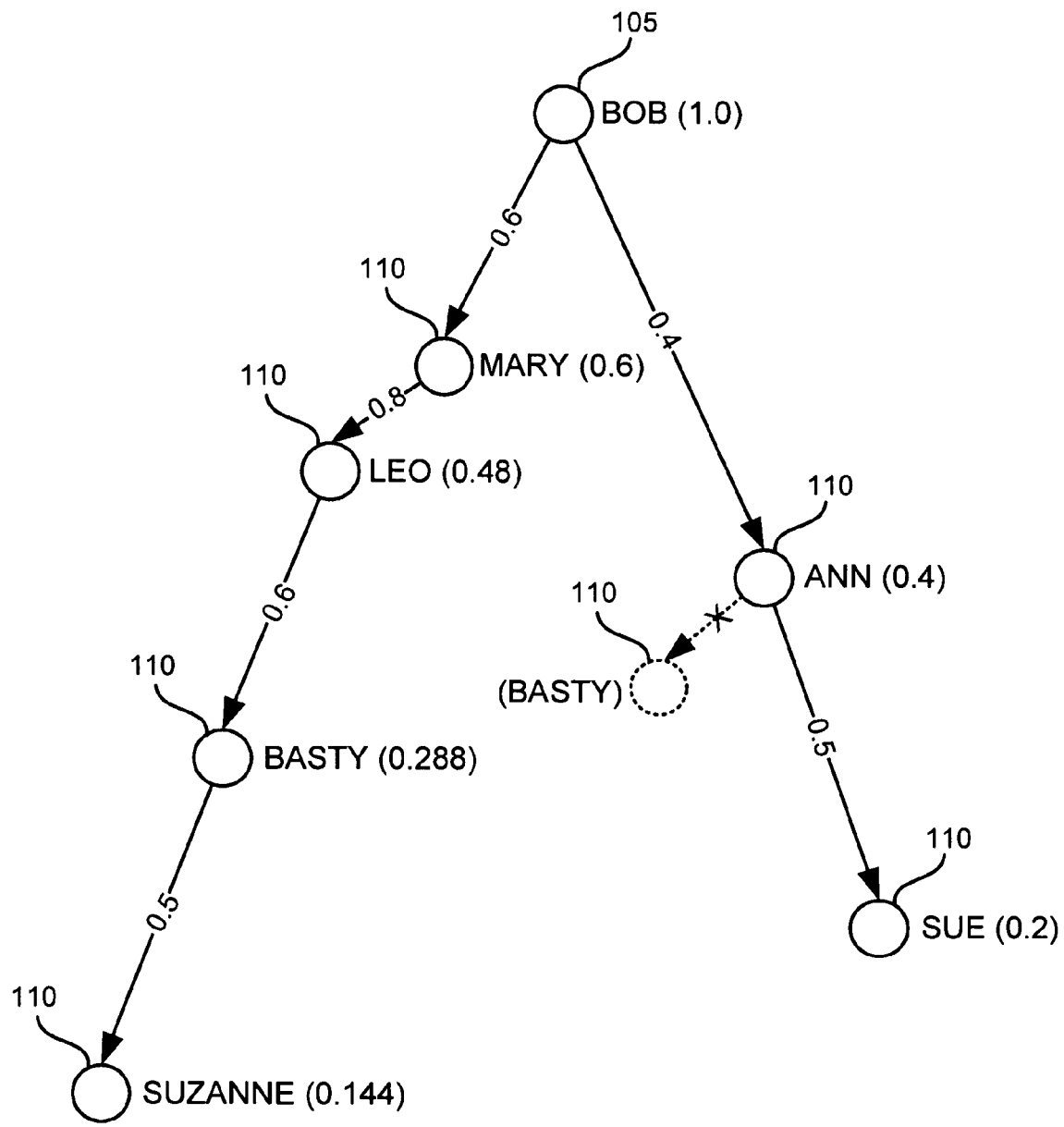
FIG. 4 is a diagram showing non-discrete trust values assigned to informers in an informer network in accordance with an illustrative embodiment of the invention.

The sample data above result in a "tree of trust" for the user Bob as shown in FIG. 4. Trust values are indicated by their distance from Bob in the vertical direction, with more trusted informers closer to the top. Note that Leo is now trusted more (0.48) than Ann (0.40), which means that Basty is now a trusted informer. Additionally, Suzanne is now included among Bob's informers via Basty.

The target of a report may include a scope. In one embodiment, this is the difference between rating a single web page and an entire Internet domain. It is clear that a report that is more specific is more relevant than one which is general. Thus, the trust value may be proportionally reduced in cases where the target is not specific. Mathematically, this can be expressed by replacing the above equations for a single most-trusted informer 110 and multiple informers 110, respectively, with the following equations:

$$\text{trust}(s,t) = \text{trust}(s,i_1) \cdot \text{edge}(i_1,t) \cdot \text{specificity and}$$

$$\text{trust}(s,t) = \forall i(\text{edge}(i,t)) : \max(\text{trust}(s,i)) \cdot \text{edge}(i_{max},t) \cdot \text{specificity}.$$

In these equations, specificity represents the specificity of the edge to the target(edge($i_1$,t) and edge($i_{max}$,t), respectively, expressed as a value in the range [0,1], where 0 indicates complete generality and 1 indicates compete specificity.

Tagging is a new method of sorting and categorizing resources found online. It was popularized by the Web site del.icio.us and is now used by many Internet sites. Within the present invention, tags can also be used to vary trust values and quality values. When a user indicates trust in an informer 110, she can add tags indicating particular areas in which this informer 110 is trusted more (or less, or not trusted at all). For example, if a user's friend Bob is a good car mechanic but has a very bad sense of humor, the user might give Bob's informer file the tags "car," "repair," "auto," "-funny," "-humor." This means that Bob's reports will take precedence on pages tagged as "auto," "repair," or "auto," and that his reports will be deprecated on pages tagged as "humor" or "funny." (A dash "-" is commonly used by Internet applications to indicate the negation of a term.)

In another embodiment, a degree attribute is included with each tag. This would normally represent the degree that the tag applies to its target, and for metadata-containing documents would represent the degree of trust placed in that informer for the given tag.

Constructing and Maintaining a Personalized Database of Trusted Metadata

Figure 5:
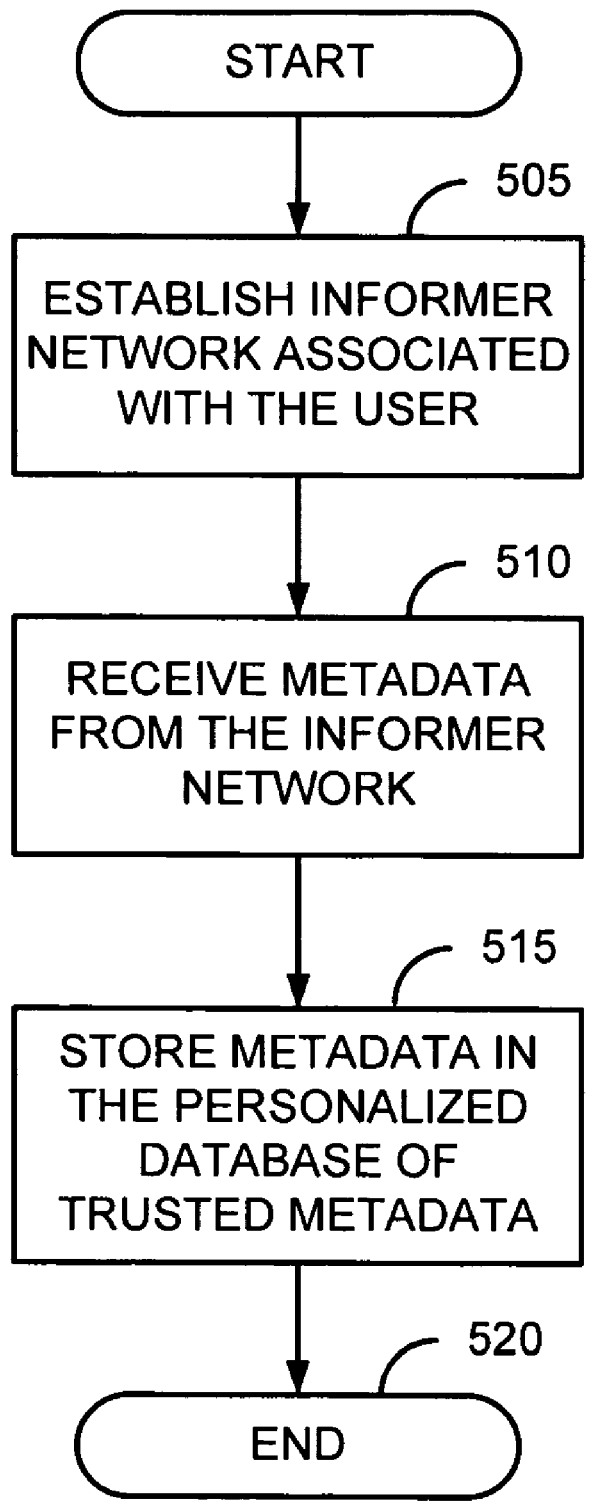
FIG. 5 is a flowchart of a method for constructing a personalized database of trusted metadata in accordance with an illustrative embodiment of the invention.

One application of the present invention is to construct and maintain, for each user, a personalized database of trusted metadata. FIG. 5 is a flowchart of a method for constructing a personalized database of trusted metadata in accordance with an illustrative embodiment of the invention. At 505, an informer network 100 of trusted informers 110 is established as explained above. At 510, informer files from informers 110 in the informer network 100 are received. At 515, the informer files are analyzed, and reports contained in the received informer files are stored in the personalized database of metadata. In one embodiment, the informer files are analyzed as explained in connection with FIGS. 2A-2D. At 520, the process terminates.

The database of trusted metadata can be stored on any computer that is accessible by the user of the system. Different applications of the database may, for performance reasons, dictate that the database be located in different places. For example, searching requires integration with other large search databases such as those used by search engines. Therefore it makes sense in such cases for the database of trusted metadata to be located remotely from the user and near the search-engine databases. On the other hand, giving warnings about dangerous resources on a user's computer requires high-speed access to the database so that users can be warned quickly. In this application, it makes more sense for the database to be located on the user's local machine. In one illustrative embodiment, several versions of a given user's database may exist in different places.

Herein, each user's trusted metadata database is sometimes referred to as a discrete entity. In practice, and especially in cases where the database is stored on a remote computer, it may be advantageous for the metadata from multiple users to be stored in a single "master database." Overlap between users' databases is likely, and it would waste space to store the same metadata separately for each user. In this embodiment, the "master database," when queried by a user, returns data in the same manner as if that user's metadata was the only metadata in the database, thus creating a "virtual database" for each user.

Figure 6:
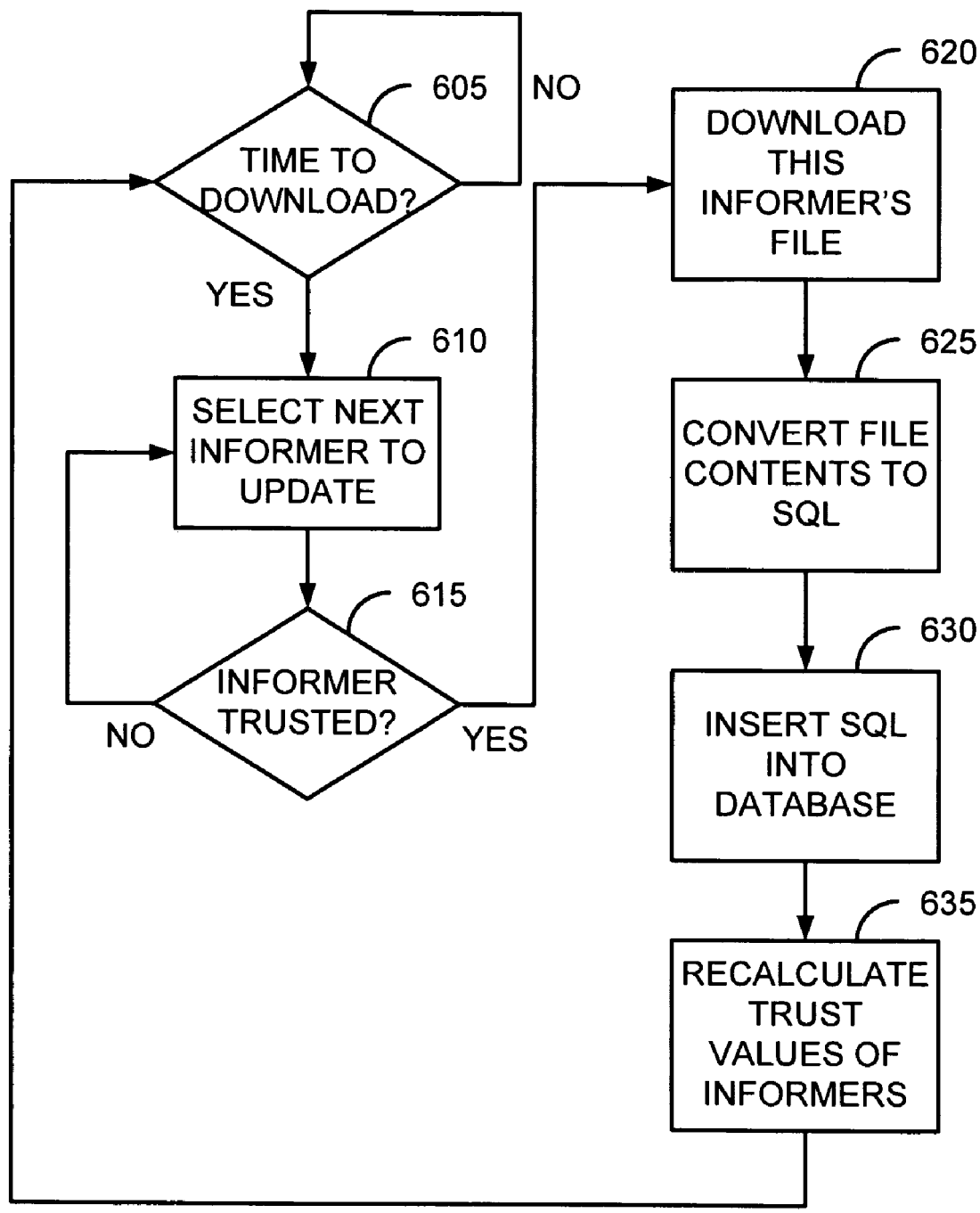
FIG. 6 is a flowchart of a method for constructing and maintaining a personalized database of trusted metadata in accordance with another illustrative embodiment of the invention.

FIG. 6 is a flowchart of a method for constructing and maintaining a personalized database of trusted metadata in accordance with another illustrative embodiment of the invention. At 605, the process waits a user-specified interval between downloads of informer files. At 610, an informer 110 is selected to be added or updated. In this embodiment, informers 110 are selected based on how long it has been since their file was last downloaded, with never-downloaded informers having the highest priority, followed by oldest-downloaded informers. If the chosen informer 110 is not trusted at 615, the process returns to 610, and another informer 110 is selected. At 620, the chosen informer's file is downloaded. For example, the informer's file may be downloaded using the normal Hypertext Transport Protocol (HTTP) protocol. At 625, the reports from the informer's file are converted from RSS to Structured Query Language (SQL) using Extensible Stylesheet Language Transformations (XSLT). At 630, the generated SQL is executed on the database, entering the informer's reports. At 635, the trust values of all informers may be re-calculated to reflect possible changes caused by the newly downloaded informer's reports. In some embodiments, the method of FIG. 6 is repeated on a regular basis to keep the database synchronized with the contents of the informers' files.

To limit the size of the database, the user 105 can specify a minimum trust level that is required for an informer to be added to the database. This prevents the database from becoming full of infinitesimally trusted informers and their reports. This also catches the intuitive notion that regardless of how much trust is expressed, an average person will not trust the opinions of someone who is very many hops away. For example, the user may specify that any values below 0.1 should be considered undefined.

To prevent possible abuse in the non-discrete model, the user 105 can also specify, in some embodiments, a decay factor d which is multiplied in for each hop between distinct informers when calculating the trust value.

It is conceivable that an informer's file may at times be corrupted, either by accident or by a malicious attacker. To prevent this corrupted data from being used, a corruption-detection algorithm can be used while the database is being built or updated. One illustrative corruption-detection algorithm compares the reports of a newly-retrieved informer file with reports from this informer 110 already present in the database. If contents of the file have changed significantly since the last time the file was retrieved, the new data is not immediately applied to the database but stored in a separate "probationary" area. The definition of "changed significantly" can be adjusted to each user's risk tolerances. Obvious suspicious activities would include: (1) A report being changed beyond a certain threshold (e.g., the quality rating of a report is changed from "low quality" to "high quality", or the report on an informer is changed from "distrust" to "trust"); (2) large numbers of reports being deleted; or (3) large numbers of new reports being added.

In this illustrative embodiment, the contents of the informer file is integrated into the live database only if subsequent retrievals of the informer's file over a specified period agree with the data in the probationary area. The motivation for this strategy is that an informer 110 whose file had been altered would be able to notice and repair the file within the chosen time period.

General Application

Figure 7:
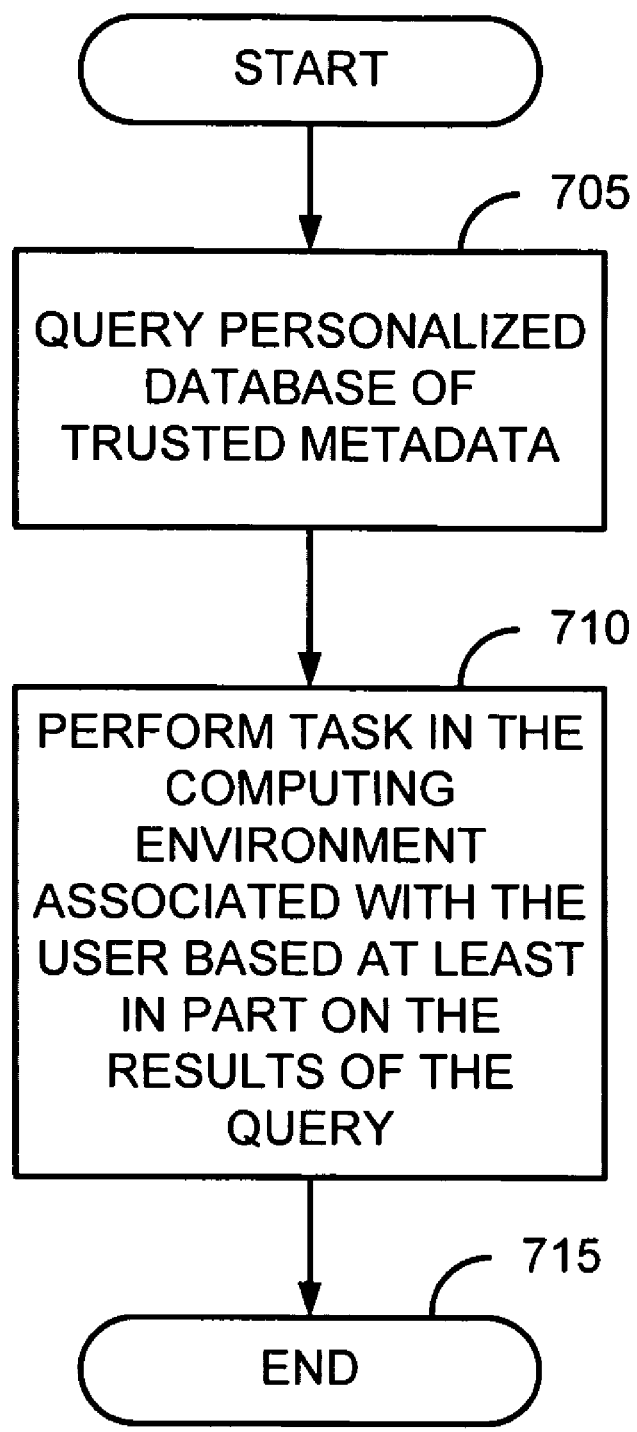
FIG. 7 is a flowchart of a method for incorporating a personalized database of trusted metadata in a computing environment associated with a user, in accordance with an illustrative embodiment of the invention.

FIG. 7 is a flowchart of a method for incorporating a personalized database of trusted metadata in a computing environment associated with a user 105, in accordance with an illustrative embodiment of the invention. At 705, a personalized database of trusted metadata is queried. The query may be prompted, for example, by a resource or other item, whether on-line or tangible, that user 105 has encountered and about which user 105 desires trustworthy information. In other cases, the query may be prompted by a situation in which an item is to be processed by computer. For example, an on-line advertisement may be treated differently in a computing environment associated with user 105 depending on the level of trust that user 105 has in the business entity associated with the on-line advertisement. In still other situations, the query may be prompted by a need to process a data transaction between user 105 and an informer 110 in a manner that takes into account the level of trust user 105 has in informer 110. For example, informer 110 may desire to access data belonging to user 105. Still other situations not specifically listed herein may prompt a query to the personalized database of trusted metadata at 705.

At 710, a task is performed in the computing environment associated with user 105 based at least in part on the results of the query to the personalized database of trusted metadata. The task performed at 710 can vary widely, depending on the specific embodiment. Some representative examples are described in more detail below. At 715, the process terminates.

Application to Search Results

One embodiment of the invention enhances the quality of results from Web search engines. The present invention can aid the user in finding resources by using the metadata contained in the database to locate and give preference to resources that are rated as being high in quality by trusted informers 110. Presently, Internet resources are most commonly found by using Web search engines. Examples of such search engines include GOOGLE, MSN SEARCH, A9, and YAHOO. These search engines begin by accepting a search query string from a user. This string is then matched by various algorithms or combinations of algorithms to resources cataloged by the search engine's database. Possible algorithms range from simple pattern-matching to complex matrix computations such as latent semantic analysis. Perhaps the most famous of these algorithms is the PageRank algorithm by Lawrence Page, which assigns a numeric "importance rank" to resources based on the number of incoming links.

In one embodiment, the results returned from a search engine are improved by using metadata from the database as factors in ordering the search results. The most relevant factors are the reported quality of a result and the trust values of the informers 110 that have reports about that result.

Consider the following simple example. Using existing algorithms, a search engine has determined that three documents (A, B, and C) match the user's query string and has assigned them (respectively) importance ranks of 2, 5, and 9. Without the present invention, document C would be returned first because it has the highest importance rank. However, this embodiment of the invention adds another measure to be used in sorting: The three documents are looked up in the database, and relevant metadata used as additional factors in sorting. Assume that document A is reported as being high quality and that this report is highly trusted by the user. This would result in document A's importance rank being multiplied by some modifier which includes both the reported quality level of A and the distance from the user to the informer 110 who made the report. Additionally, the content of the metadata database may also be searched. For example, if the user's query string is "fish", reports containing the tag "fish" or which contain "fish" in the report's descriptive text may have their rank enhanced even more.

To understand how the invention differs from existing search techniques, it is useful to view Internet searching as consisting of three phases.

In the first phase, primitive search engines of the early Internet trusted the metadata of documents completely. Tricksters hoping to have their pages show up in more searches began to fill their metadata tags with popular search phrases, often repeating words hundreds of times.

The second phase began with GOOGLE, which overcame this problem by not trusting the pages themselves, but by inferring "referrals" from external links. Links to a page by other pages were taken to be positive endorsements of that page. More incoming links meant a better search position. (GOOGLE called this measure of a page's importance PageRank.) The implicit logic was that these incoming links could be trusted because they presumably were made by someone other than the author of the page. This made it harder to falsely inflate search ranks, but it wasn't long before tricksters were finding ways to sneak "false links" onto pages to achieve the same inflated search rank for chosen pages. (The most common techniques are known as "Googlebombing" and "Spamdexing.")

The present invention marks a new third phase of searching. Instead of blindly assuming that every link on the Web is placed there in good faith, it only considers reports that are known to be trusted. Additionally, instead of assuming that every link is an endorsement, it allows for explicit reports of quality to be given (both positive and negative). These reports are not all treated equally, but preference is given to those that are more trusted by the searcher, as calculated by algorithms such as those described above. People more trusted by the searcher are more likely to share the searcher's opinions about what constitutes high quality. This system allows for high quality sites to shine and poor quality sites to be weeded out.

Every search query is a question: "What pages are most related to X?" Current search engines assume there is a single correct answer to each query. But consider a query like "Britney Spears." (The most popular GOOGLE query for 2004.) A fan would probably want to see her official site and maybe lyrics pages. A musician might want to see reviews and music tabs. Current search engines cannot differentiate because they only consider "objective" measures like the number of incoming links to a page.

Figure 8:
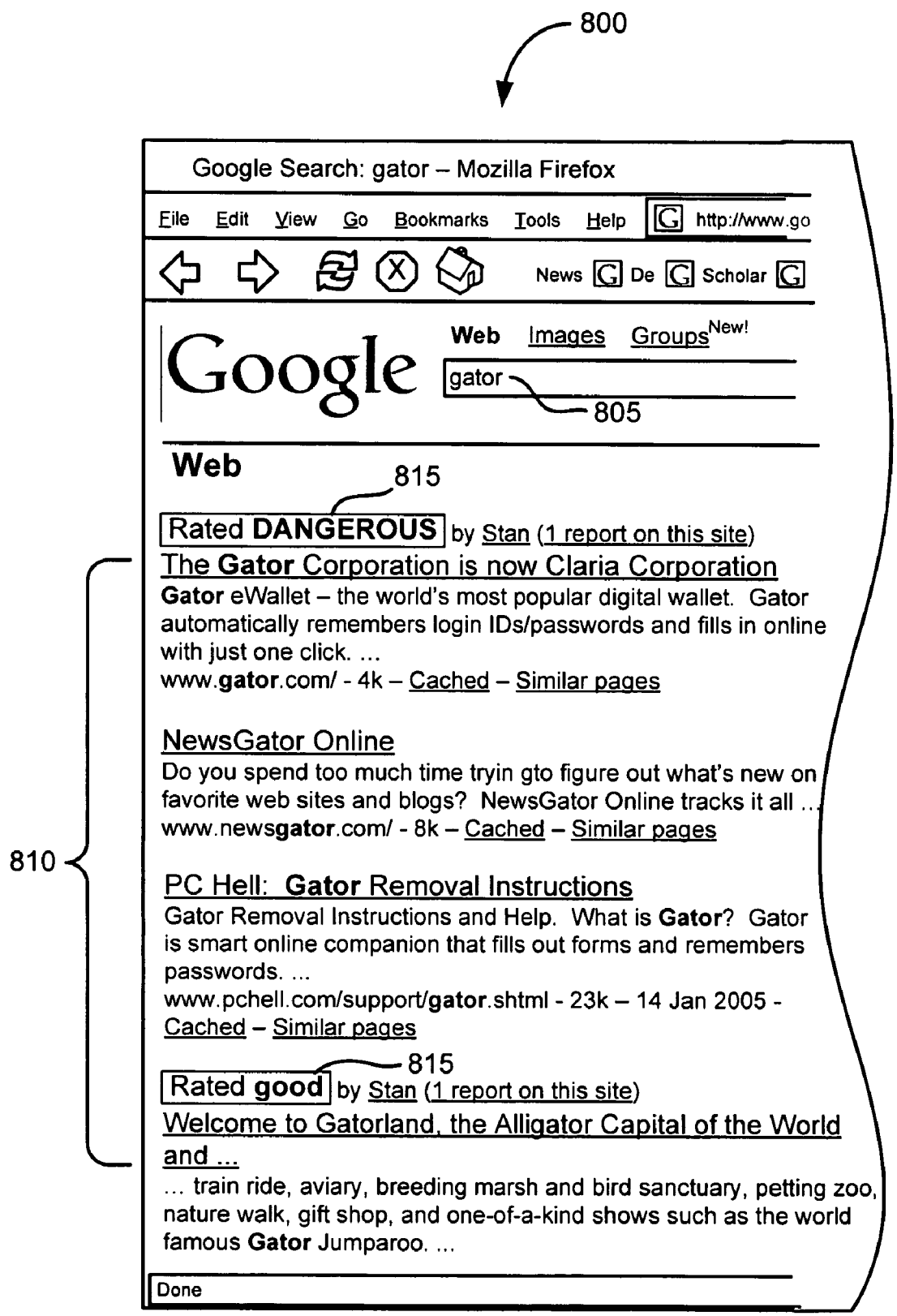
FIG. 8 is an illustration of the application of a personalized database of trusted metadata to a search of the World Wide Web, in accordance with an illustrative embodiment of the invention.

FIG. 8 is an illustration of the application of a personalized database of trusted metadata to a search of the World Wide Web, in accordance with an illustrative embodiment of the invention. FIG. 8 shows a portion of a Web page 800 containing the results of a GOOGLE search. In this example, a user 105 has input a search query 805 ("gator") to the search engine. The search engine has returned results (or "hits") 810. The top search result 810 is marked with a "dangerous" quality rating 815 based on reports from trusted informers 110 in the user's personalized database of trusted metadata, as explained above. In contrast, the bottom search result 810 has a quality rating 815 of "good." In this simple example, both quality ratings are based on reports from the same informer 110 (Stan).

Application to Feedback and Protection

Another illustrative embodiment provides feedback from trusted sources concerning resources. Resources include, without limitation, Web pages, files, and application programs that are retrieved by a Web-browser application ("browser"). When the resource is requested, the browser (or additional code such as an extension added to the browser) queries the database for reports about the resource. In one embodiment, the most trusted report is displayed as an icon in the browser's toolbar and all reports are displayed in a sidebar of the Web browser. Additionally, if the most trusted report indicates that the resource is dangerous, the loading of the resource in the browser is blocked, and the user is asked if he is sure he wants to continue to the dangerous page. Additionally, the browser component can query the database about every link which is found on the loaded page and make stylistic changes to links based on the reports found. For example, if the most trusted report indicates that the link would take the user to a resource rated as dangerous, a thick red border or other marking is added to the displayed link.

Those skilled in the art will recognize that this functionality could be added to any program with browser-like functionality. For example, a word processor that can open pages retrieved over a network could also look up and display reports about loaded files.

Figure 9:
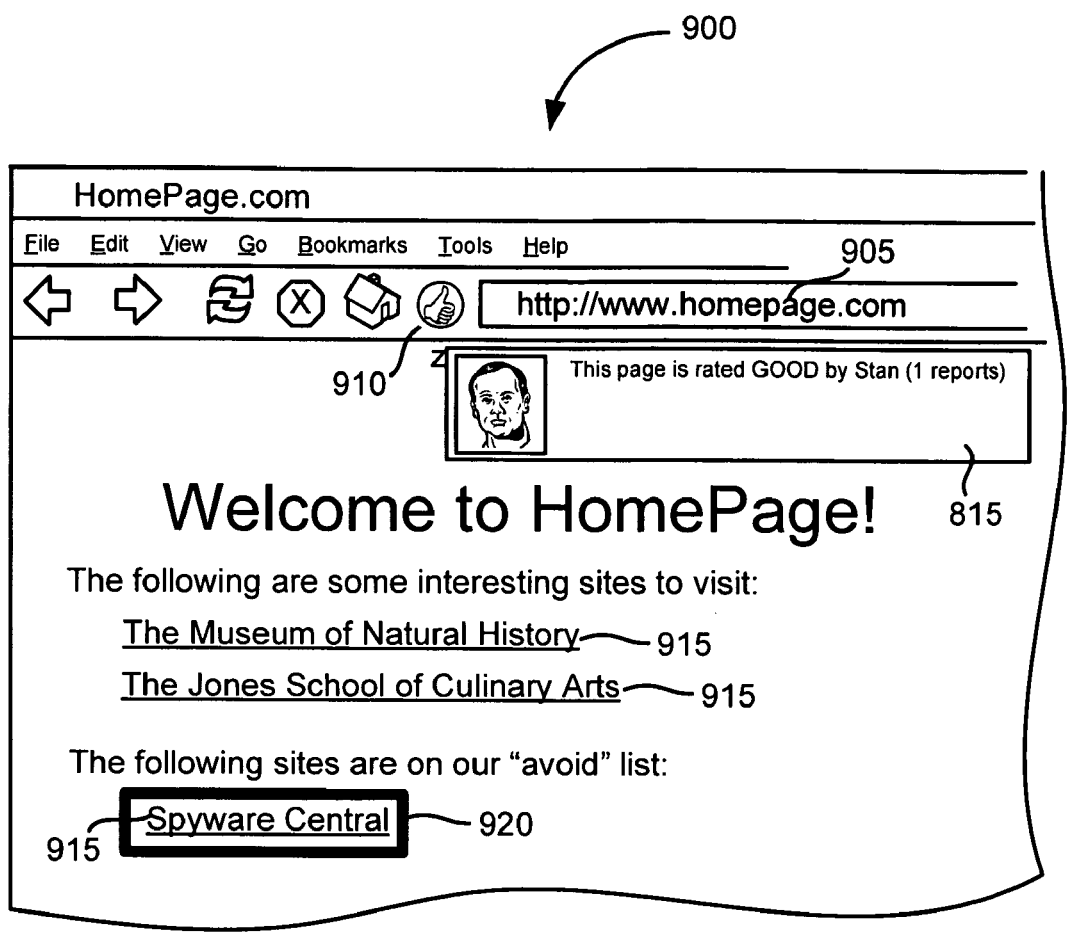
FIG. 9 is an illustration of the application of a personalized database of trusted metadata to browsing Web pages, in accordance with an illustrative embodiment of the invention.

FIG. 9 is an illustration of the application of a personalized database of trusted metadata to browsing Web pages, in accordance with an illustrative embodiment of the invention. FIG. 9 depicts a portion of a Web page 900 corresponding to a URL 905. In this illustrative embodiment, an iconic quality indicator 910 is shown for each Web page displayed in the browser. For example, a "thumbs up" icon might indicate a Web page rated "good" by a trusted informer 110. Likewise, a "thumbs down" icon might indicate a Web page rated "bad" or "dangerous" by a trusted informer 110. A quality rating 815 from the database can also be displayed, as shown in FIG. 9. In some embodiments, the full report from the applicable trusted informer 110 is displayed when a page having a quality rating 815 of "dangerous" is encountered. In FIG. 9, Web page 900 includes hyperlinks 915. In some embodiments, the quality rating of all links on a Web page are indicated through some type of annotation such as color coding or other markings. In the embodiment illustrated in FIG. 9, only pages rated "dangerous" are flagged, and such hyperlinks are marked with a heavy border 920. In the example of FIG. 9, the hyperlink "Spyware Central" points to a Web site that a trusted informer 110 has rated as "dangerous."

Application to Exploration of Resources

Users often have a difficult time finding new high-quality resources on the Internet. When users are bored or simply want to discover something new, one embodiment of the invention consults the database to display a number of randomly chosen reports. In one implementation, these reports are displayed on a page displayed in the browser. Additionally, pressing a special key combination causes the browser to load a randomly chosen report automatically.

The user 105 may optionally specify constraints for the reports chosen. For example, users would normally not want to see reports about resources which are rated as bad or dangerous. Alternatively, the user 105 may specify certain tags which are to be preferred when choosing reports. For example, the user 105 may specify that resources with tags of "funny" or "humorous" are to be preferred.

Application to Validation

Another illustrative embodiment of the invention is a system that determines the validity of files. Cryptographic hash functions can generate a unique "fingerprint" for any file. This fingerprint is a sequence of characters much shorter than the original file, but that uniquely identify the file. Should the file change, even by a single bit, then the fingerprint will be different. Examples of these algorithms are MD5 and SHA-1. By using this "fingerprint" as the target of reports, the database can be used to store reports on specific files. For example, the SHA-1 hash of a file could be encoded as a URI using the following format (other formats are also possible): sha-1://3aa6f328e7b62d7ac606fda4b4347c6b1e2e4504.

After a file is downloaded, or when the user 105 selects a file to validate, a "fingerprint" is generated and the database is queried for reports associated with that fingerprint. For example, a software publisher can make available an informer file containing the fingerprints of its products even though its software is actually distributed through a system of mirrors or via Bittorrent. If this informer 110 is trusted by the user (either directly, or through other trusted informers), reports from the publisher will be in the user's database and the user will have confirmation that the file he or she downloaded is identical to that of the software publisher.

Application to Process Identification and Control

Another illustrative embodiment enables a user 105 to identify and control the execution of processes (computer programs) on a computer. A URI can also identify a process. For example, a program named "winlogon.exe" running on the Microsoft Windows XP operating system could be identified by the following URI (other representations are possible): process://Win32/winlogon.exe.

Most operating systems provide a program such as a "task manager" for the user to see which processes are running at a given time. One embodiment of the invention is a program that displays reports from trusted informers 110 concerning the quality of these processes and descriptions of the processes. However, many viruses appear under the name of other processes. It is thus advisable that reports on a process name be accompanied by a report on the contents of the process file, using one of the fingerprint algorithms described in the previous section.

Figure 10:
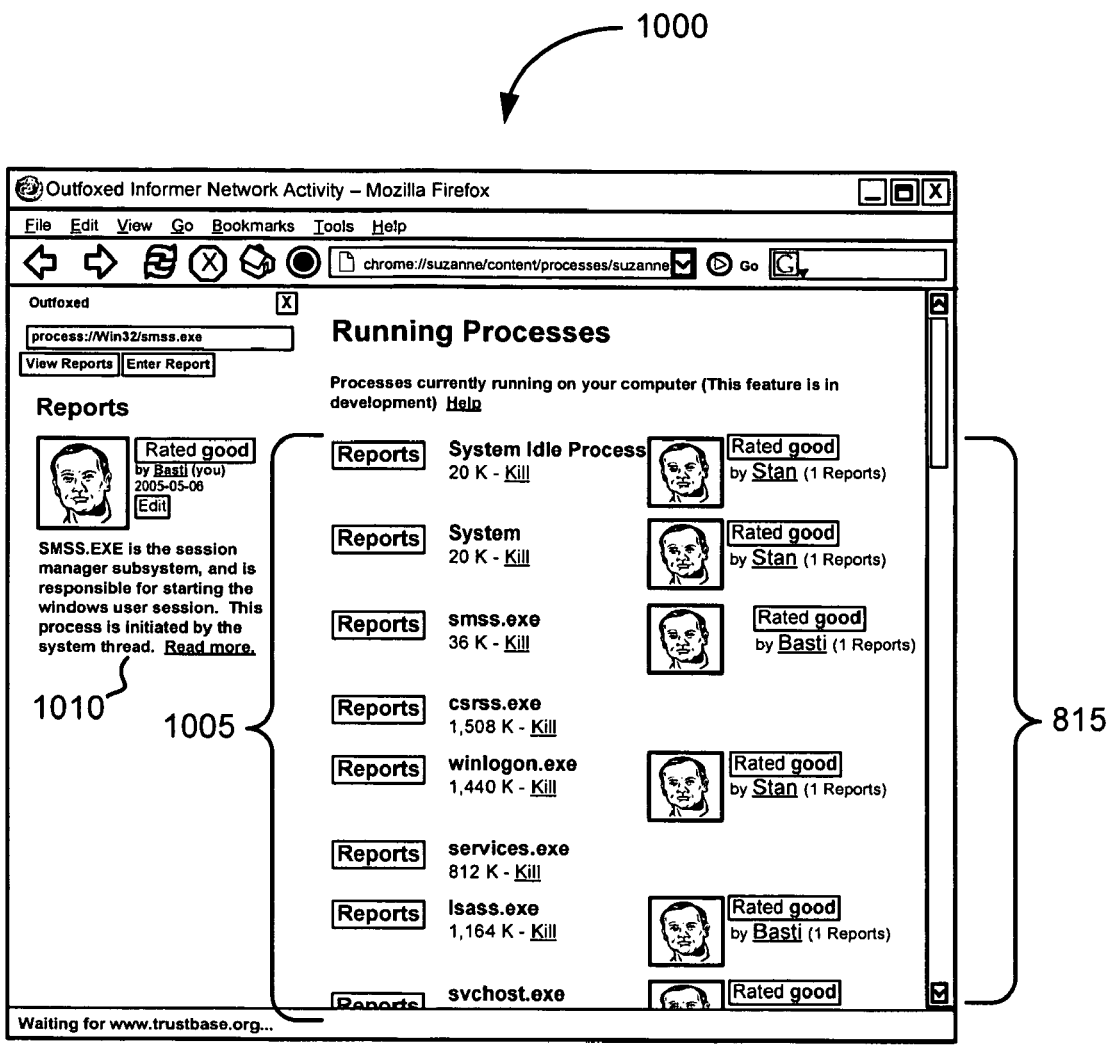
FIG. 10 is an illustration of the application of a personalized database of trusted metadata to processes running on a computer, in accordance with an illustrative embodiment of the invention.

FIG. 10 is an illustration of the application of a personalized database of trusted metadata to processes running on a computer, in accordance with an illustrative embodiment of the invention. FIG. 10 shows an application window 1000 that lists running processes 1005 on a computer. A quality rating 815 is displayed for each running process 1005 based on the personalized database of trusted metadata discussed above. For a particular running process 1005 that a user 105 selects, a description 1010 can optionally be provided. In the example of FIG. 10, the process "smss.exe" is selected.

A further variation of this embodiment limits the loading and/or execution of programs on the user's computer. Of course, this also applies to script files and loaded libraries, such as "dll" files on the operating system sold by Microsoft Corporation under the trade name WINDOWS. Herein, "programs" is used in the broad sense, referring to any executable data on a computer. Programs that are reported to be dangerous (or meeting some other criteria) by informers 110 trusted by the user 105 can be prevented from executing. For even more security, the user could specify that only those processes that are explicitly trusted may be executed.

This application is embodied as an additional function added to the module(s) of the computer operating system which is responsible for executing programs and loading libraries. When a request is made for the execution of a program, this function queries the database for reports on the process. (Ideally, this would be done by computing the fingerprint of the process and looking for corresponding reports.) If the most trusted report does not meet the minimum trust requirements specified by the user, the process is prevented from launching.

Application to Restricted Data Access

In yet another illustrative embodiment of the invention, access to a user's data is limited to those who have a trust level above a predetermined value. This requires un-spoofable identification of the requesting party, which can be accomplished through a public-key/private-key cryptographic system.

Informers 110 can store a public key in their respective informer files. When a request for data is made to the server, the server requests some piece of information that can only be generated by using the requester's private key. In one implementation, the server provides some text that should be encrypted by the requester's public key. After receiving back the encrypted text, the server then attempts to decrypt it by using the informer's public key, which was earlier retrieved from the requester's informer file and stored in the database. If the server can successfully decrypt the message, then the identity of the requester is established. If this requester is trusted beyond a predetermined level, then the requested data is sent to the requester.

Application to Trusted Communication

Figure 11A:
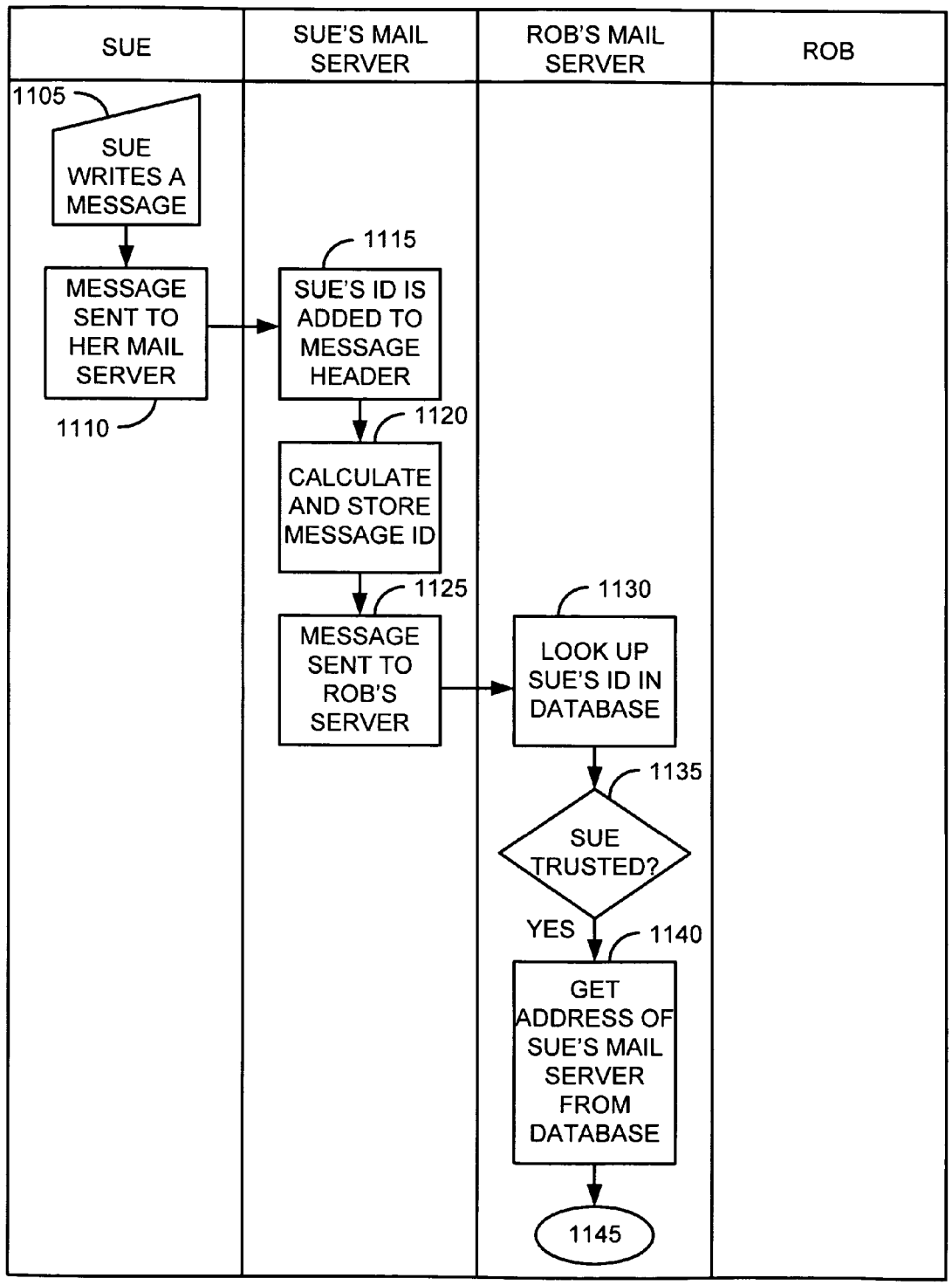
FIGS. 11A and 11B are a flow diagram of a method for trusted message delivery in accordance with an illustrative embodiment of the invention.
Figure 11B:
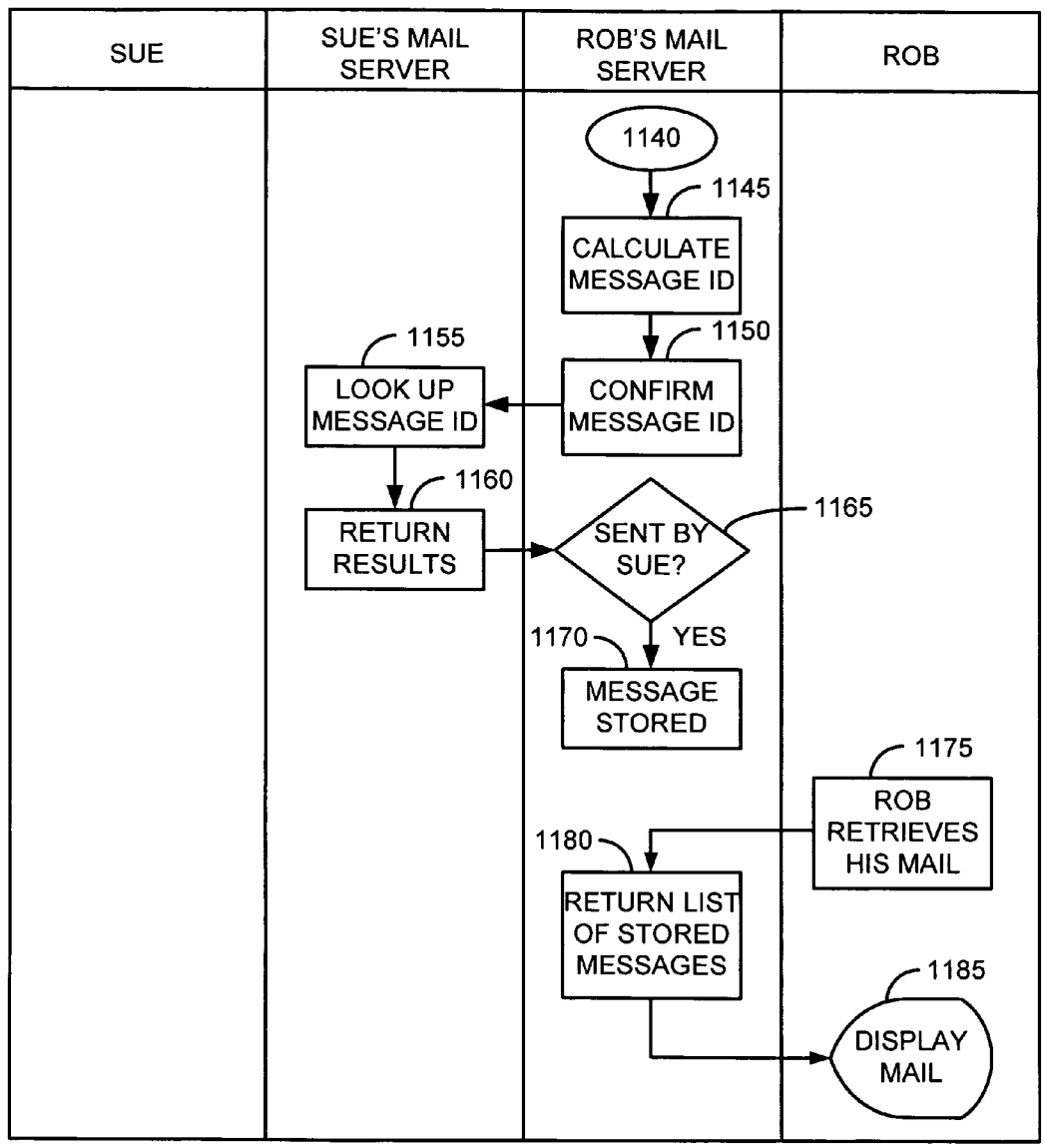

FIGS. 11A and 11B are a flow diagram of a method for trusted message delivery in accordance with an illustrative embodiment of the invention. This embodiment is a method for exchanging messages in such a way that either party can prevent further communication by indicating distrust of the other. FIGS. 11A and 11B illustrate this method for a sample message sent from Sue (the sender) to Rob (the recipient). However, the process may be generalized to any sender and receiver. It is assumed that sender S and receiver R indicate e-mail servers in their respective informer files and that their e-mail servers contain trust databases as described above.

At 1105, Sue composes a message. At 1110, Sue sends the message to her e-mail server. For Internet e-mail, this is done using Simple Mail Transport Protocol (SMTP). This requires Sue to authenticate herself using a username and password. At 1115, the message is received by Sue's e-mail server, which adds Sue's informer-file address to the message. For Internet e-mail, this would be done by adding a header to the message. At 1120, Sue's mail server calculates a unique ID for the message. In one embodiment, the ID is a hash of the message or a cryptographic hash such as the SHA-1 algorithm. The server stores a record that Sue sent the message with the particular ID. At 1125, the message is sent to Rob's e-mail server. For Internet mail, this can also be done using SMTP. At 1130, the address of Sue's informer page is extracted from the message headers and is looked up in Rob's metadata database. If Rob's database does not indicate that Sue is trusted at 1135, the message may be deleted or marked as "distrusted." In this case, the rest of the process is skipped until Rob checks his mail at 1175 in FIG. 11B.

The database is further queried at 1140 to find the address of Sue's e-mail server, as indicated in her informer file. This ensures that the authenticity of the message will be verified only by the server which is specified by Sue in her informer file (it is assumed that only Sue has control over the contents of this file).

Referring next to FIG. 11B, the ID of the message is calculated at 1145 using the same algorithm as at 1120. At 1150, a request is sent to Sue's e-mail server (using the address found at 1140) asking for confirmation that Sue sent the message with ID found at 1145. Many protocols are possible for Block 1150. In one embodiment, this is implemented as additional commands in SMTP. Block 1150 prevents a message from "spoofing" the identity of its sender. At 1155, Sue's server looks up the message ID by consulting the list used in 1120. At 1160, the results of Block 1155 are sent back to Rob's e-mail server. If, at 1165, Sue's server does not confirm that she sent the message, the message is deleted or marked as "possibly spoofed." If Sue's server confirms, at 1165, that she sent the message, the message is stored at 1170.

At some later time, Rob checks his e-mail, at 1175, by requesting messages from his e-mail server. For Internet e-mail, this is typically done using the POP3 protocol. At 1180, Rob's e-mail server returns all stored messages. Finally, at 1185, Rob's e-mail messages are displayed in his e-mail program.

Application to Hotlists

In another illustrative embodiment, a list of interesting things (typically, Web-site URLs) is compiled for each user 105. The list is ordered by a voting system, where reports by informers 110 are counted as votes. Votes are weighted by the assigned quality and trust placed in the reporting informer. Optionally, an aging function can be included to bias the list towards new things. This can be represented by the following formula:

$$score_{URI} = \sum_{reports} quality \cdot trust \cdot f(age).$$

One good choice for the aging function $f(age)$ is $e^{-age}$, which approaches zero as the report gets older.

Application to Product Information from a Mobile Device

In yet another illustrative embodiment, a user 105 enters product information into a wireless communication device such as a mobile phone or personal digital assistant (PDA) and gets back trusted reports about the product and/or companies associated with the product (manufacturer, distributor, etc.). In one embodiment, the product information is obtained by taking a picture of or otherwise scanning the product's bar code.

Application to Web Advertising

Trust evaluations of companies can also be used to influence the display of on-line advertising. For example, if a company is rated as being high quality by an informer 110 who is trusted by the user 105, advertisements from that company are given preference. For example, consider the model used by GOOGLE ADWORDS and ADSENSE. Advertisers bid on keywords, and when a user is on a page judged to be relevant to one of these keywords, ads are shown in descending order based on bid amounts. Advertisers who bid more are thus more likely to have their ads shown and to have them shown in prominent positions.

In an illustrative embodiment of the invention, two important things are added to this (or any other) ad distribution model. First, the order in which ads are shown can be influenced by the quality rating given to the advertiser by a trusted informer 110. Thus, if a friend, blogger, company, or non-profit that a user 105 trusts has given a report that company X is high in quality, ads from company X are given preference in a Web browser. Likewise, if a trusted informer 110 has given a report that company Y is of low quality, ads from company Y are downgraded or entirely removed from consideration.

There are several mathematical ways in which ads could be "given preference" or "downgraded." One approach is a trust-to-dollar or trust-to-percent conversion function. For example, if, for a given user 105, informer A has a trust value of 0.5 (on a 0 to 1 scale) and informer A reports the quality of company C to be 0.5 (also on a 0 to 1 scale), then a bid on a keyword by company C is enhanced for the given user 105 by bid=bid+f'(trust, quality) or bid=bid*f(trust, quality). In one illustrative embodiment, the function f( ) is a simple multiplication of the trust t placed in the informer 110 by the quality given to the advertiser: $f(t,q):=t*q$. In the foregoing example, a bid of $1 by company C will be given an effective value of $1+f(0.5,0.5)=$1.25. In an alternative embodiment in which trust is determined completely by hops, a simple bracket system is used. That is, ads from companies given a good report by informers zero hops away (user 105) are displayed first. Ads from companies given a good report by informers one hop away (e.g., friends of the user) are displayed next, and so on, the list concluding with ads without reports. Due to the limitation of advertising space, in most embodiments only the most preferred ads may actually be presented.

Second, ads can be enhanced by including within the ad an endorsement from the rating informer 110. For example, a user 105 might see an advertisement for a camera shop which has been given a good report by her friend Bob. The advertisement can be accompanied by text or graphics indicating that Bob has endorsed the company.

Illustrative System Architecture

Figure 12A:
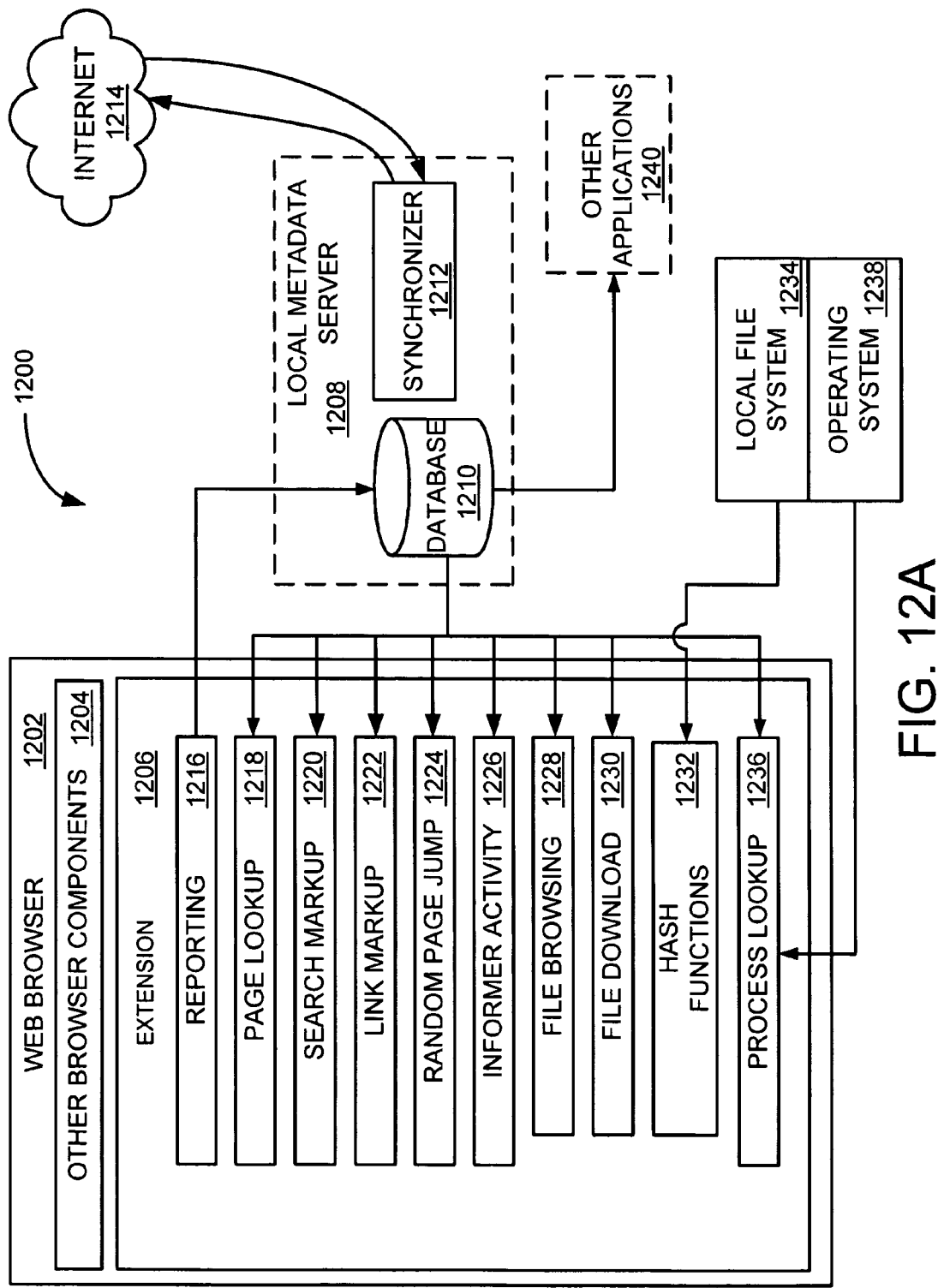
FIG. 12A is a functional block diagram of a system for incorporating trusted metadata in a computer environment associated with a user, in accordance with an illustrative embodiment of the invention.

FIG. 12A is a functional block diagram of a system for incorporating trusted metadata in a computer environment associated with a user 105, in accordance with an illustrative embodiment of the invention. In FIG. 12A, the focus is primarily on an illustrative client-side system architecture. The client aspect of system 1200 includes a Web browser 1202 made up of various standard Web-browser components 1204 and an extension 1206. Extension 1206 interfaces with local metadata server 1208, which includes personalized database of trusted metadata 1210 and synchronizer 1212. For simplicity, some functional components of metadata server 1208 have been omitted in FIG. 12A. Synchronizer 1212 is configured to access the Internet 1214 to construct, update, and maintain database 1210, as explained above.

Three broad functions performed by system 1200 are (1) the publishing of metadata in informer files via an informer network; (2) the receipt and filtering of metadata from the informer network to construct a personalized database of trusted metadata; and (3) applying the personalized database of trusted metadata to a resource or other item that a user 105 encounters or, generally, to a task performed in the computing environment. As demonstrated above, the type of task to be performed can vary widely, depending on the embodiment.

Extension 1206 may be divided into a number of functional modules, depending on the particular embodiment. The names of and boundaries separating these functional modules in FIG. 12A are largely arbitrary, however, since they can be configured, combined, and subdivided in a wide variety of ways, all of which are considered to be within the scope of the invention as claimed. Further, not all of the functional modules shown in FIG. 12A are necessarily present in every embodiment of the invention.

Reporting module 1216 sends reports from user 105 regarding informers 110 or resources or other items to database 1210. Page-lookup module 1218 looks up, in database 1210, quality ratings 815 associated with Web pages 900 that user 105 encounters. Search-markup module 1220 applies quality ratings 815 from database 1210 to search results 810. Link-markup module 1222, using trusted metadata from database 1210, annotates hyperlinks (see 920 in FIG. 9) on a Web page 900 to indicate their quality ratings.

Random-page-jump module 1224 consults database 1210 to display one or more randomly selected reports to user 105 to help user 105 explore new on-line resources. Informer-activity module 1226 determines whether informers 110 in the informer network 100 associated with user 105 have recently updated their informer files. File-browsing module 1228 applies trusted metadata from database 1210 to lists of computer files displayed in a file browser such as WINDOWS EXPLORER.

File-download module 1230 uses digital signatures and trusted metadata from database 1210 to verify the authenticity of files downloaded from Internet 1214. Hash-functions module 1232 computes hash functions (digital signatures) such as MD5 and SHA-1. Hash-functions module 1232 interfaces with local file system 1234. Process-lookup module 1236 identifies running processes 1005 on a computer and supplies a quality rating 815 for each running process 1005 using trusted metadata from database 1210. In performing its function, process-lookup module 1236 consults operating system 1238.

In some embodiments, applications 1240 other than Web browser 1202 can make use of database 1210. In still other embodiments, the functionality of local metadata server 1208 is integrated with operating system 1238 itself.

Figure 12B:
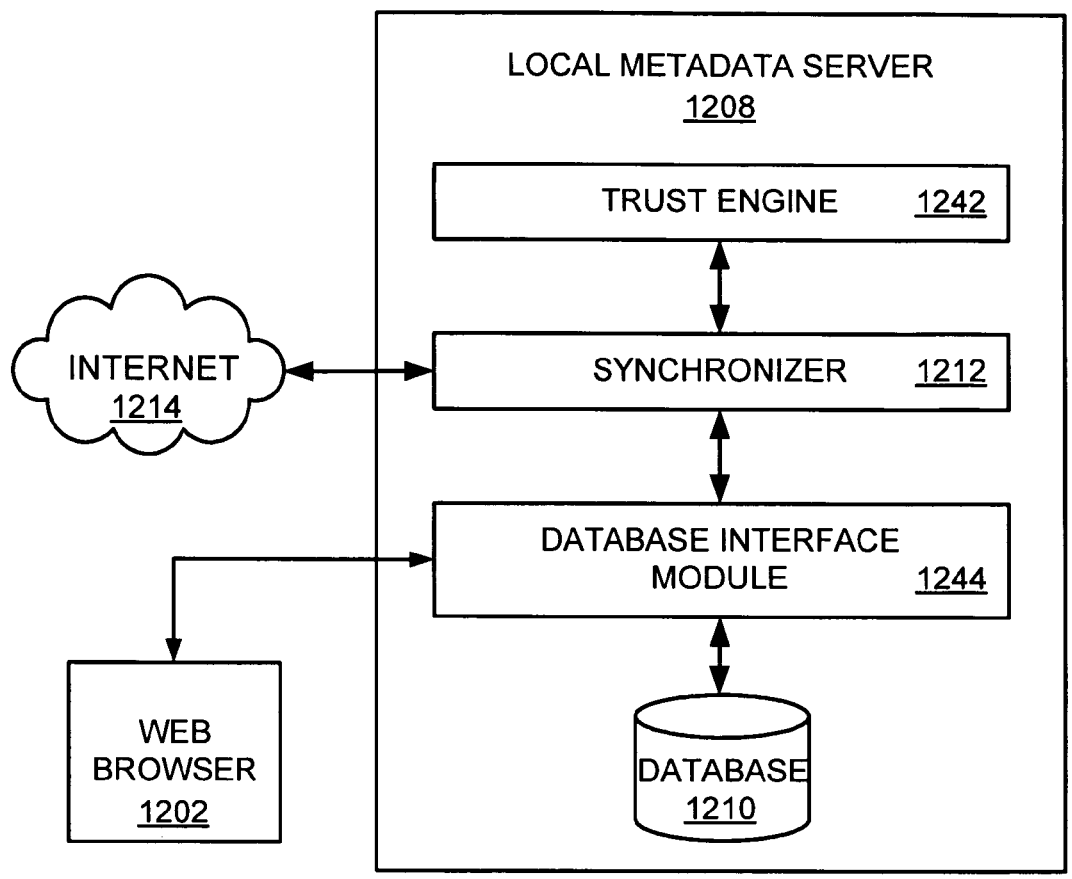
FIG. 12B is a functional block diagram of a local metadata server in accordance with an illustrative embodiment of the invention.

FIG. 12B is a functional block diagram of local metadata server 1208 in accordance with an illustrative embodiment of the invention. In FIG. 12B, local metadata server 1208 includes trust engine 1242, synchronizer 1212, database interface module 1244, and database 1210. Trust engine 1242 is configured to establish and maintain an informer network 100 for user 105. As explained above, synchronizer 1212 is configured to access the Internet 1214 to obtain metadata from informer network 100 that is used to construct, update, and maintain database 1210. In doing so, synchronizer 1212 obtains information regarding informer network 100 from trust engine 1242. Database interface module 1244 is configured to store reports acquired by synchronizer 1212 in database 1210. Database interface module 1244 is also configured to respond to queries to database 1210 from a local client such as Web browser 1202. As explained above, in some embodiments, local metadata server 1208 is remote rather than local. In general, the metadata server is located wherever it is needed to ensure acceptable performance of system 1200.

The various embodiments of the invention described above can be implemented in a variety of ways. For example, some embodiments are implemented as program instructions executable by a processor. The program instructions may be stored on a computer-readable storage medium such as, without limitation, a magnetic disk, an optical disk, or a solid-state memory. In general, the invention can be implemented in software, firmware, customer hardware, or any combination thereof.

In conclusion, the present invention provides, among other things, a method and system for constructing and using a personalized database of trusted metadata. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims. For example, though the WINDOWS operating system has been mentioned, the principles of the invention can be applied to other operating systems such as the operating system distributed under the trade name LINUX.

What is claimed is:

1. A method for providing trustworthy information about an item, the method comprising:
    querying a personalized database of trusted metadata concerning the item, the personalized database of trusted metadata including at least one report, the at least one report emanating from metadata received from an informer network, the informer network including a computer user and at least one informer, each informer in the informer network being trusted by the computer user either directly or indirectly to have opinions that coincide with those of the computer user, each indirectly trusted informer being trusted directly by at least one other informer in the informer network, each of the at least one report including one of an explicit subjective assertion, by an informer in the informer network from which that report originated, regarding the quality of an item and an explicit expression, by the informer in the informer network from which that report originated, of a degree of trust in another informer regarding the another informer's opinions; and
    indicating to the computer user the item's subjective quality based on at least one report about the item from an informer in the informer network in the personalized database of trusted metadata.

2. The method of claim 1, wherein the querying is performed in response to an Internet search by the computer user and the item is a search result in a list of displayed search results.

3. The method of claim 2, wherein at least one of the search results in the list of displayed search results is prioritized in accordance with its subjective quality as determined from the personalized database of trusted metadata.

4. The method of claim 1, wherein the querying is performed in response to the computer user's navigating to a Web page using a Web browser and the item is the Web page.

5. The method of claim 4, further comprising:
    querying the personalized database of trusted metadata regarding a linked Web page pointed to by a hyperlink on the Web page; and
    indicating the linked Web page's subjective quality based on at least one report about the linked Web page in the personalized database of trusted metadata.

6. The method of claim 5, wherein indicating the linked Web page's subjective quality includes visibly marking the hyperlink.

7. The method of claim 1, wherein the querying is performed in response to the computer user's downloading a file from a network and the item is the file.

8. The method of claim 7, further comprising:
    validating the file by querying the personalized database of trusted metadata for reports associated with a unique digital signature of the file.

9. The method of claim 1, wherein the querying is performed in response to a request from the computer user to display a list of processes running on a computer and the item is a process in the displayed list of processes running on the computer.

10. The method of claim 1, wherein the querying is performed in response to an attempt by the computer user to launch a process on a computer and the item is the process.

11. The method of claim 10, further comprising:
    restricting execution of the process when the process's subjective quality satisfies predetermined criteria.

12. The method of claim 1, wherein the querying is performed in response to a request from the computer user to display, in a file browser application, a list of files accessible from a computer and the item is a file in the displayed list of files.

13. The method of claim 1, wherein the querying is performed in response to a request from the computer user via a wireless communication device for information about a product and the item is the product.

14. The method of claim 13, wherein the request is input to the wireless communication device via a digital image of an identification code associated with the product, the digital image being captured by the wireless communication device.

15. A method for processing an item by computer, the method comprising:
    querying a personalized database of trusted metadata concerning the item, the personalized database of trusted metadata including at least one report, the at least one report emanating from metadata received from an informer network, the informer network including a computer user and at least one informer, each informer in the informer network being trusted by the computer user either directly or indirectly to have opinions that coincide with those of the computer user, each indirectly trusted informer being trusted directly by at least one other informer in the informer network, each of the at least one report including one of an explicit subjective assertion, by an informer in the informer network from which that report originated, regarding the quality of an item and an explicit expression, by the informer in the informer network from which that report originated, of a degree of trust in another informer regarding the another informer's opinions;
    determining the item's subjective quality based on at least one report about the item from an informer in the informer network in the personalized database of trusted metadata; and
    processing the item in accordance with its subjective quality.

16. The method of claim 15, wherein the item is an on-line advertisement and the on-line advertisement's subjective quality is derived from a query of the personalized database of trusted metadata concerning a business entity with which the on-line advertisement is associated.

17. The method of claim 16, wherein processing the item in accordance with its subjective quality includes prioritizing display of the on-line advertisement, on-line advertisements having a higher subjective quality being given priority over advertisements having a lower subjective quality.

18. The method of claim 16, wherein an endorsement from a rating informer is displayed with the on-line advertisement.

19. The method of claim 15, wherein processing the item in accordance with its subjective quality includes adding the item to a compilation of items of interest to the computer user.

20. The method of claim 19, wherein the item is selected at random in response to a request from the computer user.

21. The method of claim 15, wherein the item is selected at random and processing the item in accordance with its subjective quality includes bringing the item to the computer user's attention when the item's subjective quality satisfies predetermined criteria specified by the computer user.

22. A system for incorporating trusted metadata in a computing environment associated with a computer user, the system comprising:
   a processor; and
   a memory containing a plurality of program instructions configured to cause the processor to:
   query a personalized database of trusted metadata, the personalized database of trusted metadata including at least one report, the at least one report emanating from metadata received from an informer network, the informer network including the computer user and at least one informer, each informer in the informer network being trusted by the computer user either directly or indirectly to have opinions that coincide with those of the computer user, each indirectly trusted informer being trusted directly by at least one other informer in the informer network, each of the at least one report including one of an explicit subjective assertion, by an informer in the informer network from which that report originated, regarding the quality of an item and an explicit expression, by the informer in the informer network from which that report originated, of a degree of trust in another informer regarding the another informer's opinions; and
   perform a task in the computing environment based at least in part on results of a query of the personalized database of trusted metadata, the results being based on at least one report about the item from an informer in the informer network in the personalized database of trusted metadata.

23. A computer-readable storage medium containing program instructions executable by a processor to incorporate trusted metadata in a computing environment associated with a computer user, the program instructions comprising:
   a first instruction segment configured to query a personalized database of trusted metadata, the personalized database of trusted metadata including at least one report, the at least one report emanating from metadata received from an informer network, the informer network including the computer user and at least one informer, each informer in the informer network being trusted by the computer user either directly or indirectly to have opinions that coincide with those of the computer user, each indirectly trusted informer being trusted directly by at least one other informer in the informer network, each of the at least one report including one of an explicit subjective assertion, by an informer in the informer network from which that report originated, regarding the quality of an item and an explicit expression, by the informer in the informer network from which that report originated, of a degree of trust in another informer regarding the another informer's opinions; and
   a second instruction segment configured to perform a task in the computing environment based at least in part on results of a query of the personalized database of trusted metadata, the results being based on at least one report about the item from an informer in the informer network in the personalized database of trusted metadata.

* * * * *